(12) United States Patent
Miyake et al.

(10) Patent No.: US 11,879,722 B2
(45) Date of Patent: Jan. 23, 2024

(54) METHOD AND SYSTEM FOR ESTIMATING CONVERGENCE OF CHANGES IN DIMENSIONS OF MOLDED ARTICLE OVER TIME

(71) Applicants: IIDA Co., Ltd., Kanagawa (JP); THE UNIVERSITY OF TOKYO, Tokyo (JP)

(72) Inventors: Shigeo Miyake, Fukushima (JP); Yusuke Kajihara, Tokyo (JP); Shuichi Nowatari, Fukushima (JP); Seiichiro Iwasaki, Fukushima (JP); Junya Nowatari, Fukushima (JP)

(73) Assignees: IIDA Co., Ltd., Kanagawa (JP); THE UNIVERSITY OF TOKYO, Tokyo (JP)

( * ) Notice: Subject to any disclaimer, the term of this patent is extended or adjusted under 35 U.S.C. 154(b) by 527 days.

(21) Appl. No.: 17/270,856

(22) PCT Filed: Feb. 27, 2020

(86) PCT No.: PCT/JP2020/008076
§ 371 (c)(1),
(2) Date: Feb. 23, 2021

(87) PCT Pub. No.: WO2021/171495
PCT Pub. Date: Sep. 2, 2021

(65) Prior Publication Data
US 2022/0146257 A1    May 12, 2022

(51) Int. Cl.
*G01B 15/06* (2006.01)
(52) U.S. Cl.
CPC ................................. *G01B 15/06* (2013.01)

(58) Field of Classification Search
CPC ........... G01N 21/3586; G01N 21/8422; G01N 2021/8438; G01N 21/88; G01N 21/3581;
(Continued)

(56) References Cited

U.S. PATENT DOCUMENTS

2010/0271001 A1* 10/2010 Kato .................. G01N 21/3581
324/76.12
2010/0321682 A1* 12/2010 Kato .................. G01N 21/4795
356/244

(Continued)

FOREIGN PATENT DOCUMENTS

WO    2011059044 A1    5/2011

OTHER PUBLICATIONS

International Search Report for related International Application No. PCT/JP2020/008076 dated May 12, 2020.

*Primary Examiner* — Irakli Kiknadze
(74) *Attorney, Agent, or Firm* — Renner, Otto, Boisselle & Sklar, LLP

(57) ABSTRACT

An objective of the present invention is to provide a method, or the like, for estimating the convergence of dimensional changes in a molded article over time, by utilizing the polarization intensity of terahertz waves. The present invention provides a method for estimating the convergence of changes in the dimensions of a molded article over time, the method comprising: irradiating a molded article with terahertz waves at multiple positions thereon, wherein the molded article is irradiated with the terahertz waves at each position thereon in multiple orientations about the optical axis; measuring polarization intensities of the terahertz waves transmitted through or reflected from the molded article; and determining whether the polarization intensities at the multiple positions are in a given relationship with each other.

15 Claims, 24 Drawing Sheets

(58) Field of Classification Search
CPC ............... G01N 21/8806; G01N 21/94; G01N 21/3563; G01N 2021/8427; G01N 21/552; G01N 21/21; G01N 2201/101; G01N 2021/1787; G01B 11/06; G01B 11/303; G01B 11/0633; G01B 11/16; G01B 15/06; G01B 11/24; H01M 4/139; H01M 4/0404; G01J 5/0818; G01J 3/42; G01J 3/108; G01J 11/00; G01J 3/02; G01J 3/0205; G01J 3/0208; G01J 3/0224; G02F 1/3511; G02F 1/3515; G02F 1/0311; G02F 1/035; G02F 1/35; G02B 21/14; G02B 21/0004; H05G 2/005; H05G 2/008; H05G 2/00; G03F 7/70175; G03F 7/70033; G03F 7/70916; G21K 1/06
USPC ................. 250/338.1, 360.1, 559.11, 559.24; 356/33, 244; 324/76.12
See application file for complete search history.

(56) References Cited

U.S. PATENT DOCUMENTS

| | | | |
|---|---|---|---|
| 2011/0001048 A1* | 1/2011 | Nishina | G01N 21/3581 250/360.1 |
| 2011/0108740 A1 | 5/2011 | Naitoh | |
| 2012/0326037 A1* | 12/2012 | Ohtake | G01B 11/0633 250/338.1 |
| 2015/0069240 A1* | 3/2015 | Takahashi | G01N 21/59 250/504 R |
| 2016/0169746 A1* | 6/2016 | Koyama | G01J 5/59 250/338.1 |
| 2018/0234176 A1* | 8/2018 | Kitazawa | H04B 10/0795 |

* cited by examiner

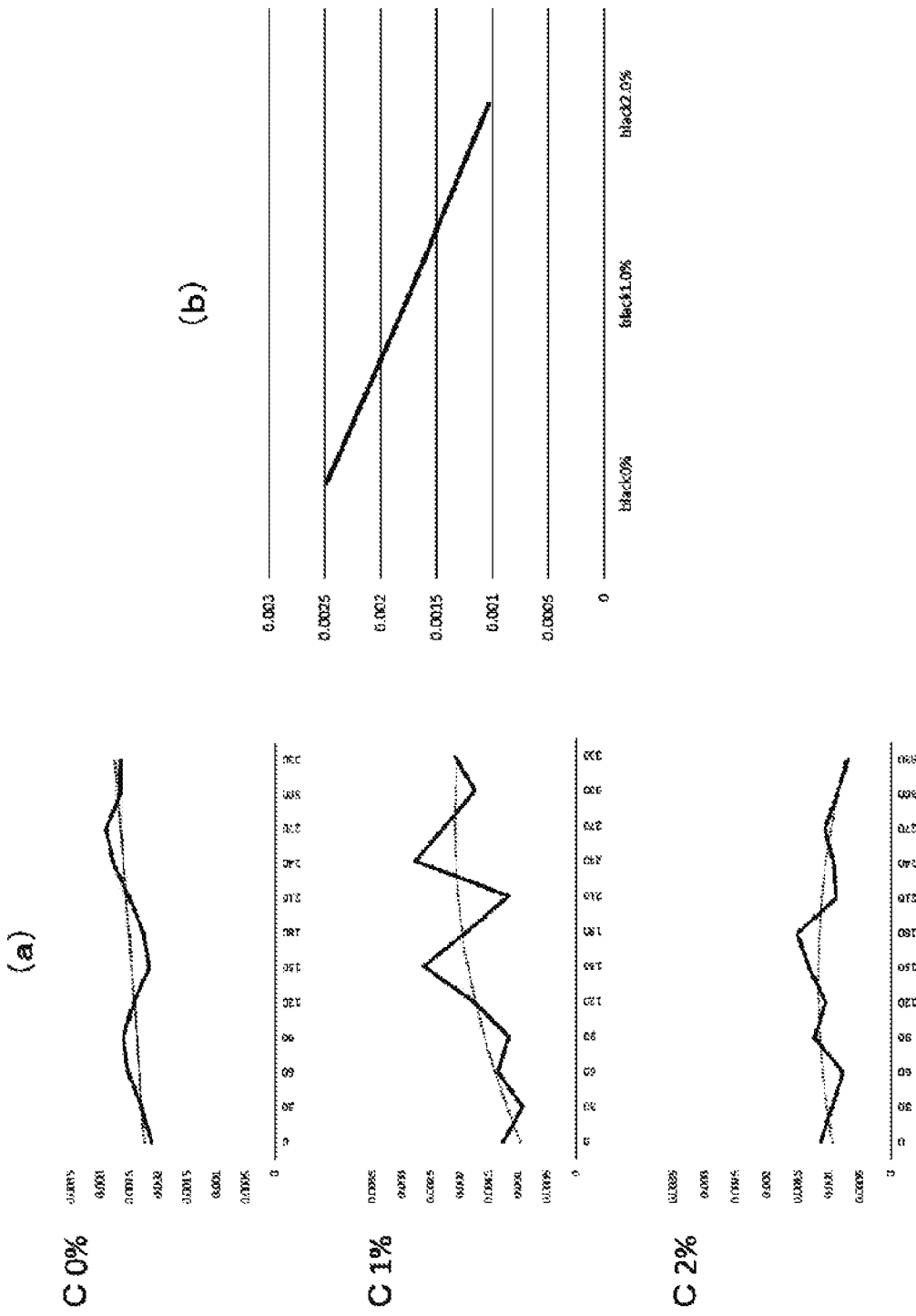

METHOD AND SYSTEM FOR ESTIMATING CONVERGENCE OF CHANGES IN DIMENSIONS OF MOLDED ARTICLE OVER TIME

TECHNICAL FIELD

The present invention relates to a method, or the like, for estimating the convergence of changes in the dimensions of a molded article over time.

BACKGROUND ART

Molded articles, such as resin molded articles, have been conventionally processed into products having specified dimensions by machining or the like. The molded articles that have been finally processed to specified dimensions, however, may be problematic because such molded articles may change in, and deviate from, the specified dimensions over time by the time of actual use.

Techniques for analyzing the internal state of an object using terahertz waves have been recently developed (Patent Literature 1).

CITATION LIST

Patent Literature

[PTL 1] WO 2011/059044

SUMMARY OF INVENTION

Technical Problem

In the conventional analysis of the internal state of an object using terahertz waves, however, it is not possible to estimate whether the dimensions of the object will change from that time on although the state of internal defects and strains can be analyzed.

It is an objective of the present invention to provide a method, or the like, for estimating the convergence of dimensional changes in a molded article over time.

Solution to Problem

The Inventors of the present invention have found for the first time that there is a correlation between the polarization intensity and the dimensional change in a molded article over time, on the basis of the knowledge that the polarization intensity after terahertz waves have transmitted through the molded article fluctuates due to the internal structure of the molded article.

The present invention provides, for example, the following items.

(Item 1)
A method for estimating convergence of changes in dimensions of a molded article over time, the method comprising:
irradiating a molded article with terahertz waves at multiple positions thereon, wherein the molded article is irradiated with the terahertz waves at each position thereon in multiple orientations about an optical axis;
measuring polarization intensities of the terahertz waves transmitted through or reflected from the molded article; and
determining whether the polarization intensities at the multiple positions are in a given relationship with each other.

(Item 2)
The method of Item 1, wherein the multiple orientations about the optical axis include multiple orientations with maximum polarization intensity, and the given relationship includes a relationship in which the polarization intensities at the multiple positions, in one of the multiple orientations with maximum polarization intensity, correlates with the polarization intensities at the multiple positions in another one of the multiple orientations with the maximum polarization intensity.

(Item 3)
The method of Item 2, wherein the given relationship includes a relationship in which the polarization intensities at the multiple positions, in one of adjacent orientations of the multiple orientations with maximum polarization intensity, correlates with the polarization intensities at the multiple positions in another one of the adjacent orientations of the multiple orientation with the maximum polarization intensity.

(Item 4)
The method of Item 2 or 3, wherein the correlation includes a correlation coefficient of about 0.9 or more.

(Item 5)
The method of any one of Items 1 to 4, wherein the molded article is a generally-circular member.

(Item 6)
The method of Item 5, wherein the multiple positions are at least four positions, and the at least four positions are (a, 0), (−a, 0), (0, a), (0, −a) with the center of the generally-circular member defined as the origin, where 0<a<r, with r representing the radius of the generally-circular member.

(Item 7)
The method of Item 5 or 6, wherein the generally-circular member is hollow.

(Item 8)
The method of Item 5 or 6, wherein the generally-circular member is solid.

(Item 9)
The method of any one of Items 1 to 8, wherein the multiple orientations about the optical axis includes about zero degrees, about 90 degrees, about 180 degrees, and about 270 degrees.

(Item 10)
The method of any one of Items 1 to 9, further comprising estimating a compressive or tensile force applied to the molded article, based on the measured polarization intensity.

(Item 11)
The method of any one of Items 1 to 10, further comprising estimating a ratio of mixture mixed with the molded article, based on the measured polarization intensity.

(Item 12)
The method of Item 11, wherein the mixture includes at least one of carbon, glass fiber, carbon fiber, and molybdenum.

(Item 13)
The method of any one of Items 1 to 12, wherein the molded article includes resin.

(Item 14)
The method of Item 13, wherein the resin includes polytetrafluoroethylene (PTFE).

(Item 15)
A system for estimating convergence of changes in dimensions of a molded article over time, the system comprising:

an irradiation means for irradiating a molded article with terahertz waves at multiple positions thereon, wherein the molded article is irradiated with the terahertz waves at each position thereon in multiple orientations about an optical axis;

a measuring means for measuring polarization intensities of the terahertz waves transmitted through or reflected from the molded article; and a determining means for determining whether the polarization intensities at the multiple positions are in a given relationship with each other.

(Item 16)

A computer system for estimating convergence of changes in dimensions of a molded article over time, the computer system comprising:

an acquiring means for acquiring polarization intensities of terahertz waves transmitted through or reflected from a molded article at multiple positions thereon, wherein each of the multiple positions is irradiated with the terahertz waves in multiple orientations about an optical axis; and a determining means for determining whether the polarization intensities at the multiple positions are in a given relationship with each other based on the acquired polarization intensities.

(Item 17)

A program for estimating convergence of changes in dimensions of a molded article over time, the program being executed by a computer system comprising a processor unit, the program causing the processor unit to execute processing comprising:

acquiring polarization intensities of terahertz waves transmitted through or reflected from a molded article at multiple positions thereon, wherein each of the multiple positions is irradiated with the terahertz waves in multiple orientations about an optical axis; and determining whether the polarization intensities at the multiple positions are in a given relationship with each other based on the acquired polarization intensities.

(Item 18)

A method for estimating convergence of changes in dimensions of a molded article over time, the method comprising:

acquiring polarization intensities of terahertz waves transmitted through or reflected from a molded article at multiple positions thereon, wherein each of the multiple positions is irradiated with the terahertz waves in multiple orientations about an optical axis; and determining whether the polarization intensities at the multiple positions are in a given relationship with each other based on the acquired polarization intensities.

Advantageous Effects of Invention

According to the present invention, it allows estimating of the convergence of dimensional changes in a molded article over time.

BRIEF DESCRIPTION OF DRAWINGS

FIG. 14 is a graph showing results of a terahertz wave polarization intensity measurement experiment performed on PTFE with carbon C mixed therewith.

DESCRIPTION OF EMBODIMENTS

Definition

As used herein, "terahertz wave" or "THz wave" means light with a wavelength of about 30 μm to about 1 mm. The "terahertz wave" or "THz wave" may be pulse-like light or continuous light.

As used herein, "polarization intensity of terahertz wave" means the degree of polarization received from an object when the object is irradiated with the terahertz wave. The "polarization intensity of terahertz wave" is measured from the terahertz waves transmitted through the object or the terahertz waves reflected from the object. When the terahertz waves do not transmit through any object, the polarization intensity of the terahertz waves is zero.

As used herein, the "convergence" of the dimensional changes in the molded article over time refers to: when the difference between a measured value by the dimensional measurement at a given position at a certain measurement time point and a measured value by the dimensional measurement at the given position at another measurement time point after an elapse of at least 7 days is about 10 μm or less, preferably about 5 μm or less, and more preferably about 1 μm or less; or when the rate of change of the measured value is about 0.05% or less, preferably about 0.03% or less, and more preferably about 0.001% or less.

Note that the rate of change of the measured value is expressed as the ratio of the absolute value of the difference between a measured value $d_0$ by the dimensional measurement at a given position at a certain measurement time point and a measured value $d_1$ by the dimensional measurement at the given position at another measurement time point after an elapse of at least 7 days, to the measured value $d_0$ by the dimensional measurement at the given position at the certain measurement time point, i.e., $|d_0-d_1|/d_0$.

As used herein, the term, "about", means±10% of the value that follows.

EMBODIMENTS OF THE PRESENT INVENTION

Hereinafter, embodiments of the present invention will be described with reference to the drawings.

Figure 1:
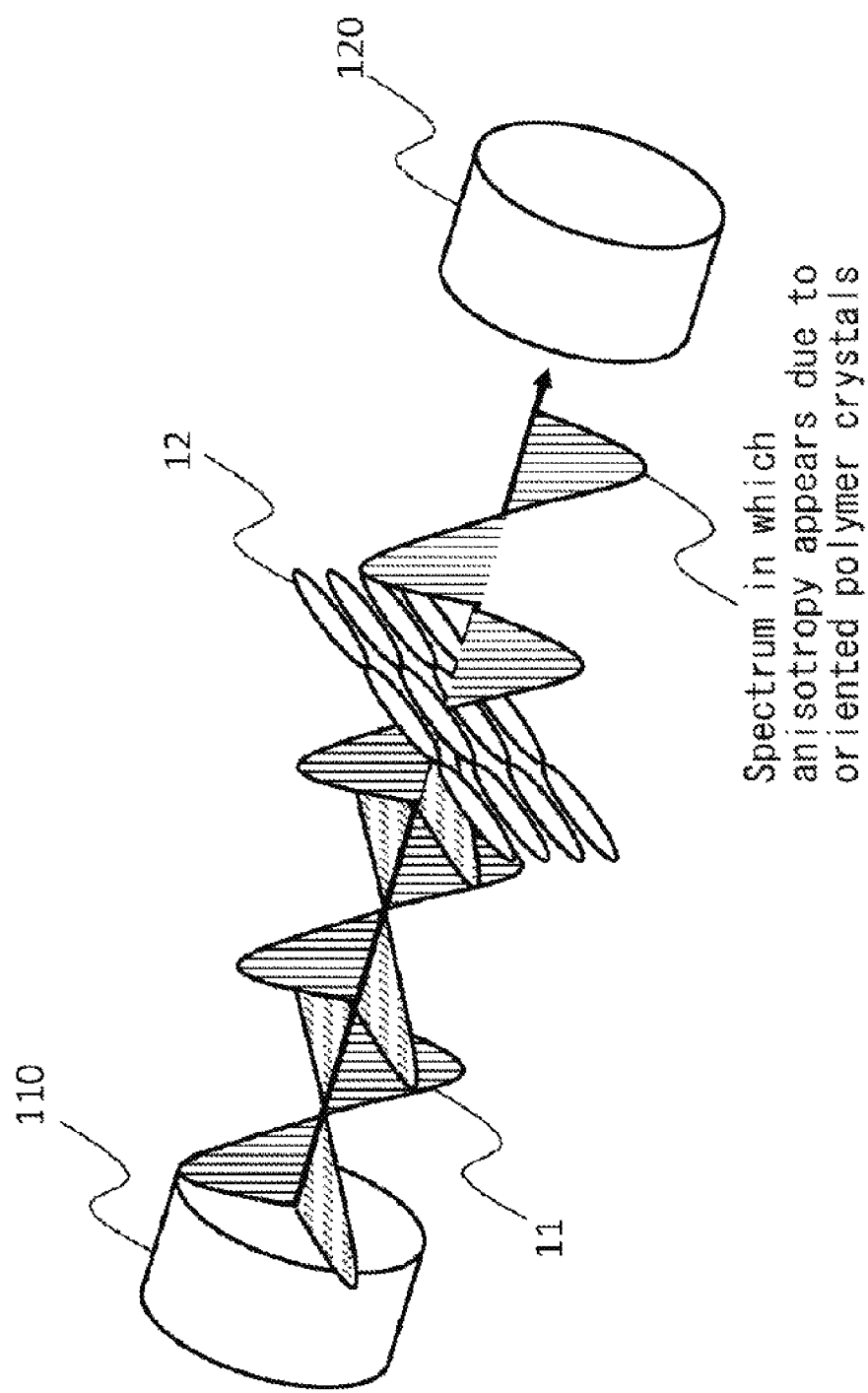
FIG. 1 is a schematic diagram showing the concept of terahertz wave polarization measurement for a molded article.

FIG. 1 schematically shows a concept of terahertz wave polarization measurement for a molded article.

Terahertz wave polarization measurement is performed using a terahertz wave light source 110 and a terahertz wave detector 120. The terahertz wave light source 110 is configured to emit terahertz waves, and the terahertz wave detector 120 is configured to detect the polarization intensity of the terahertz waves. A molded article is placed between the terahertz wave light source 110 and the terahertz wave detector 120, and the molded article is irradiated by terahertz waves 11 from the terahertz wave light source 110, followed by detecting the transmitted terahertz waves 11 with the terahertz wave detector 120, thereby to measure the polarization intensity of the terahertz waves from the molded article.

In the example shown in FIG. 1, polymer crystals 12 inside the molded article are shown schematically. As shown in FIG. 1, anisotropy appears in the spectrum of the terahertz waves 11 that have transmitted through the molded article when the polymer crystals 12 inside the molded article are oriented in a specific direction. This anisotropy is thought to be the cause of the polarization intensity of terahertz waves.

The inventors of the present invention measure the polarization intensity of terahertz waves from a molded article by irradiating the molded article with terahertz waves at multiple positions thereon, and detecting the terahertz waves that have transmitted through the molded article at each of the multiple positions. In this instance, the molded article itself is rotated, or the terahertz wave light source is rotated, relative to each of the multiple positions, to change the orientation of the terahertz waves, applied to the molded article, about the optical axis to thereby detect the terahertz waves that have transmitted through the molded article in each of the multiple orientations. Specifically, the polarization intensities of the terahertz waves of (number of positions)×(number of orientations) is to be measured. The inventors of the present invention have found that there is a correlation between the polarization intensities of the terahertz waves of (number of positions)×(number of orientations) as measured in such a manner and the changes in the dimensions of the molded article over time. Specifically, the inventors have found that the polarization intensities of the terahertz waves of (number of positions)×(number of orientations) are in a given relationship at the time of the convergence of changes in the dimensions of the molded article over time. Accordingly, determination as to whether the polarization intensities of the terahertz waves of (number of positions)×(number of orientations) are in a given relationship allows estimating of whether changes in the dimensions of the molded article over time have reached the convergence.

This may be implemented by, for example, a system 100 for estimating the convergence of changes in the dimensions of a molded article over time, which will be described below.

Figure 2:
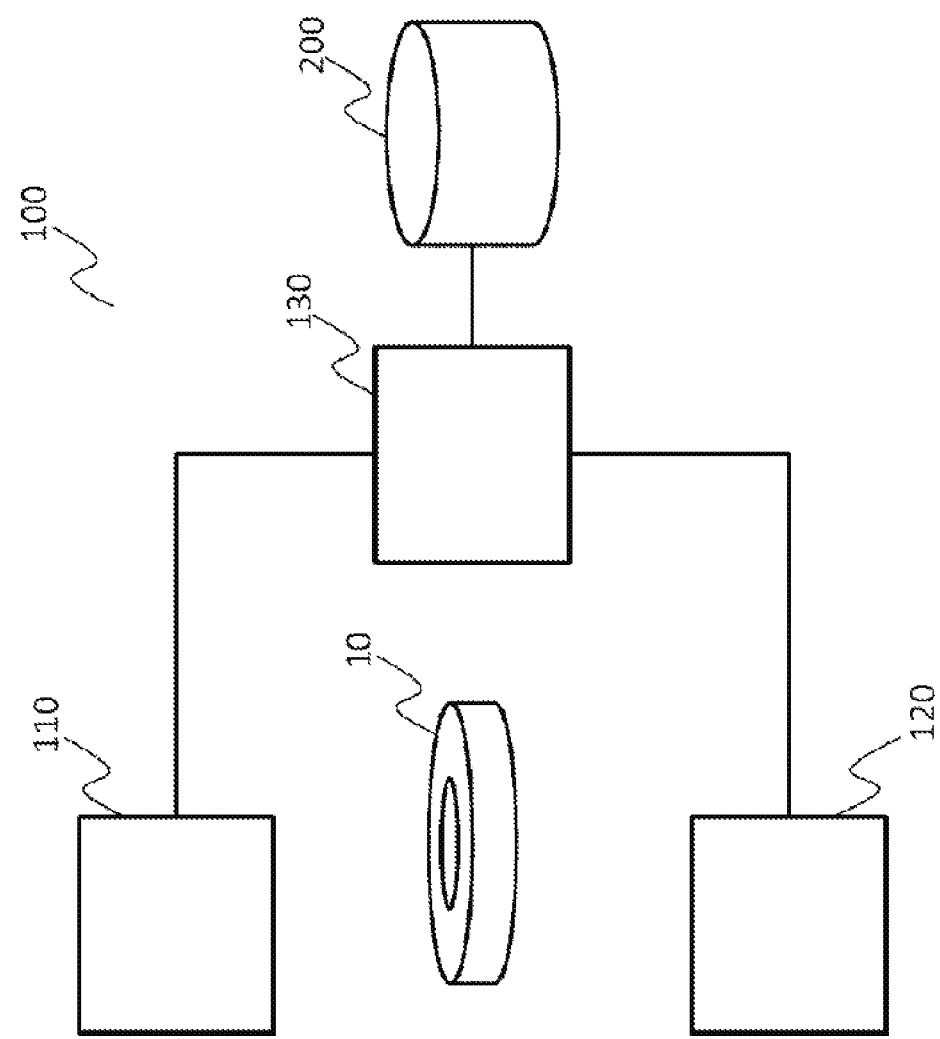
FIG. 2 is a diagram showing an example of a configuration of a system 100 for estimating the convergence of changes in the dimensions of a molded article over time.

FIG. 2 shows an example of a configuration of a system 100 for estimating the convergence of changes in the dimensions of a molded article over time.

The system 100 is configured to emit terahertz waves onto a molded article 10, to measure the polarization intensity of terahertz waves transmitted through the molded article 10, and thereby to estimate the convergence of changes in the dimensions of the molded article 10 over time. It is thought that the change in the dimensions of the molded article over time is highly related to the residual stress of the molded article, and accordingly, it is conceivable to apply the system for estimating the convergence of dimensional changes in a molded article over time according to the present invention, to the estimating of the presence or absence of the residual stress of the molded article.

Any material may be used to form the molded article 10. For example, the material may be resin, and the resin may be such resin that produces residual stress inside when processed, the dimensions of which change over time due to the effects of release of residual stress, etc., and the dimensional changes of which reach the convergence after an elapse of a certain period of time. Such resin includes, for example, fluororesin. Examples of the fluororesin may include, but are not limited to, polytetrafluoroethylene (PTFE), perfluoroalkoxylalkane (PFA), ethylene-tetrafluoroethylene copolymer (ETFE), perfluoro ethylene propylene copolymer (FEP), polyvinylidene fluoride (PVDF), polychlorotrifluoroethylene (PCTFE), ethylene chlorotrifluoroethylene copolymer (ECTFE), or a combination thereof. A resin molded article 10 may be, for example, a resin molded article formed after having undergone machining. The machining generates residual stress in the resin molded article 10, and the dimensions thereof change over time due to the release of the residual stress. The present invention is not limited to this. For example, the molded article may also consist of metallic material, ceramic material, and a composite material thereof.

The system 100 comprises a terahertz wave light source 110, a terahertz wave detector 120, and a computer system 130. The terahertz wave light source 110 and the terahertz wave detector 120 are each connected to the computer system 130. The present invention may take into consideration any connection modes of the terahertz wave light source 110 and the terahertz wave detector 120 with the computer system 130. For example, the terahertz wave light source 110 and the terahertz wave detector 120 may be connected with the computer system 130 by wire or wirelessly. For example, the terahertz wave light source 110 and the terahertz wave detector 120 may be connected with the computer system 130 through any network (e.g., the Internet, or a local area network).

The terahertz wave light source 110 can be any mechanism capable of emitting the terahertz wave. The terahertz wave light source 110 may be configured to be capable of emitting only THz waves having a specific frequency or a specific frequency band, for example. The specific frequency may be about 0 to about 5.0 THz, etc. The terahertz wave light source 110 is configured to emit only the terahertz waves having a specific frequency, so that the terahertz wave light source 110 does not need to have a capability for emitting a wide range of terahertz waves, which can simplify the structure of the terahertz wave light source 110. This leads to lowering of the cost for the system 100.

The terahertz waves emitted from the terahertz wave light source 110 transmit through the molded article 10 and reach the terahertz wave detector 120.

The terahertz wave detector 120 may be any mechanism configured to detect terahertz waves. The terahertz wave detector 120 can be configured to measure the polarization intensity of the terahertz waves. The terahertz wave detector 120 can output the polarization intensity of the detected terahertz waves as a voltage signal, for example.

The computer system 130 is further configured to determine whether the polarization intensities of the molded article 10 are in a given relationship, based on the polarization intensities of the terahertz waves measured by the terahertz wave detector 120 from the terahertz waves emitted onto multiple positions on the molded article 10. The computer system 130 can estimate that dimensional changes in the molded article 10 over time have reached the convergence when the polarization intensities at the molded article 10 are in a given relationship, while the computer system 130 can estimate that dimensional changes in the molded article 10 over time have yet to reach the convergence when the polarization intensities at the molded article 10 are not in the given relationship.

The system 100 may further be equipped with a work turntable for changing the positions on the molded article 10 that are irradiated with the terahertz waves.

FIGS. 3A to 3G are each a top view showing a work turntable 300 for changing the positions on a molded article 10 that are irradiated with terahertz waves.

A molded article 10 is placed on the work turntable 300. In the examples shown in FIG. 3, the molded article 10 is shown as a hollow, generally-circular member; however, the molded article 10 to be measured by the present invention is not limited to such a member. The shape of the molded article 10 may be any shape. For example, the shape of the molded article 10, in the cross section thereof, may be generally circular, generally elliptical, generally polygonal (triangle, quadrangle, pentagon, hexagon, etc.), generally regular polygon (generally regular triangle, generally square, generally regular pentagon, generally regular hexagon, etc.), etc. Furthermore, the shape of the molded article 10 may be solid or hollow. When the shape is hollow, the shape of the hollow part may be any shape. For example, the hollow part may be generally circular, generally elliptical, generally polygonal (generally triangle, generally quadrangle, generally pentagon, generally hexagon, etc.), generally regular polygon (generally regular triangle, generally square, generally regular pentagon, generally regular hexagon, etc.), etc. Furthermore, the molded article may be a generally columnar body, a generally tubular body, or a generally flat plate.

Spot S on the work turntable 300 is the center of the work turntable 300 and has a hole (invisible). The spot S is irradiated with terahertz waves from the terahertz wave light source 110. The positional relationship between the terahertz wave light source 110 and the work turntable 300 is fixed, and thus, the rotating of the work turntable 300 can change the orientation about the optical axis for the molded article 10 that is irradiated with the terahertz waves. The terahertz waves have directions in which the electric field vector and the magnetic field vector oscillate, and along with the changing of the orientation about the optical axis for the molded article 10 that is irradiated with the terahertz waves, the oscillation directions of the electric field vector and the magnetic field vector of the terahertz waves on the molded article 10 can also be changed. As shown in FIGS. 3A to 3D, for example, the work turntable 300 is rotated without changing the positions on the molded article 10 which are irradiated with the terahertz waves, so that the orientation of the molded article 10 irradiated with the terahertz waves can be changed.

Furthermore, changing the positions and/or orientations of the molded article 10 relative to the work turntable 300 can change the irradiation positions on the molded article 10 that are irradiated with the terahertz waves. As shown in FIGS. 3A and 3E to 3G, for example, changing the orientations of the molded article 10 relative to the work turntable can change the positions on the molded article 10 that are irradiated with the terahertz waves.

Figure 3A:
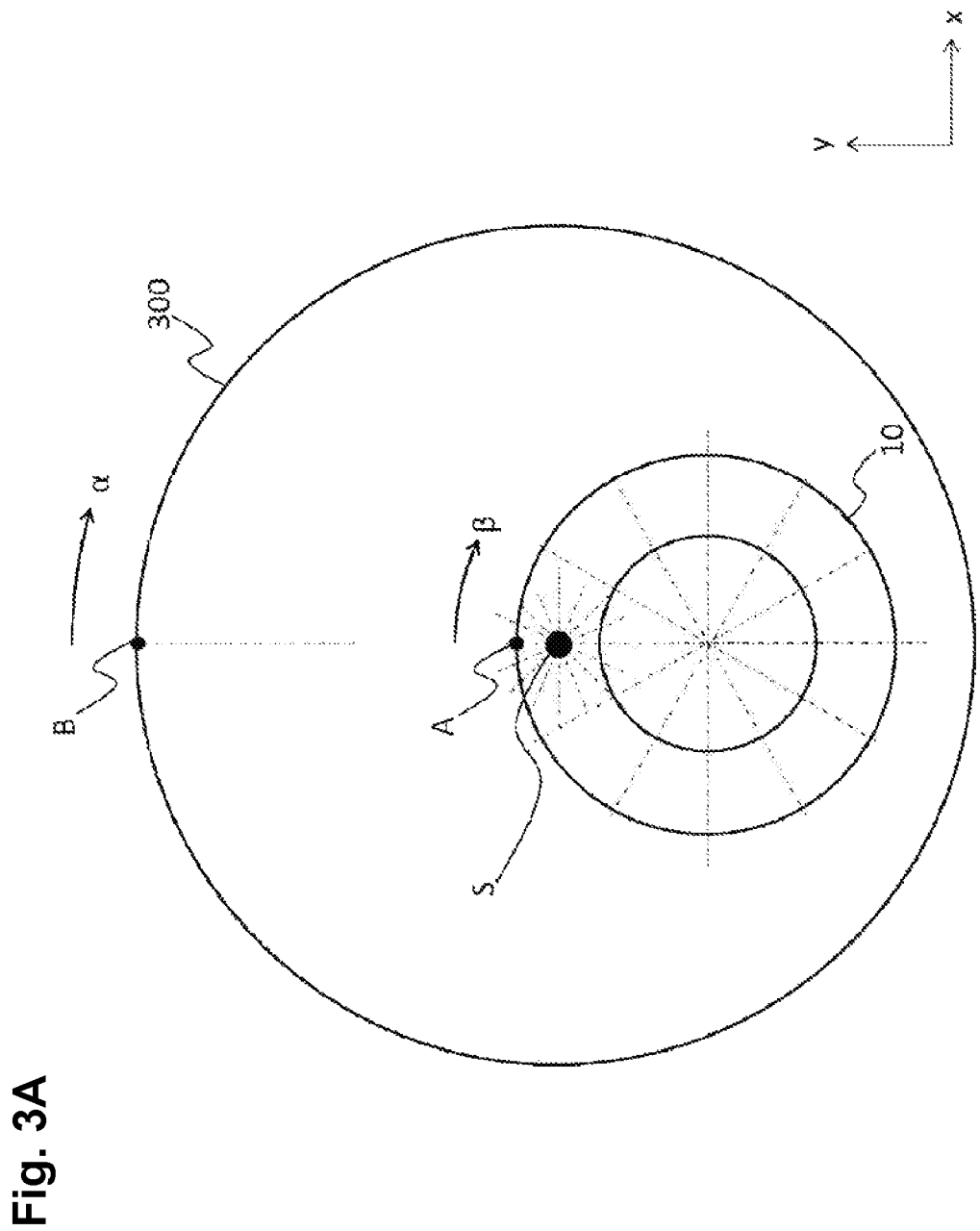
FIG. 3A is a top view showing a work turntable 300 for changing the positions on a molded article 10 that are irradiated with terahertz waves.

FIG. 3A shows a first state, and the first state represents a molded article 10 placed at a first position on a work turntable 300, where the work turntable 300 is positioned in a first orientation. The left-to-right direction in the figure is defined as the x-axis direction, while the up-and-down direction in the figure is defined as the y-axis direction. In the first state shown in FIG. 3A, the point on the molded article 10 with the maximum y coordinate is defined as A, while the point on the work turntable 300 with the maximum y coordinate is defined as B for convenience sake.

Figure 3B:
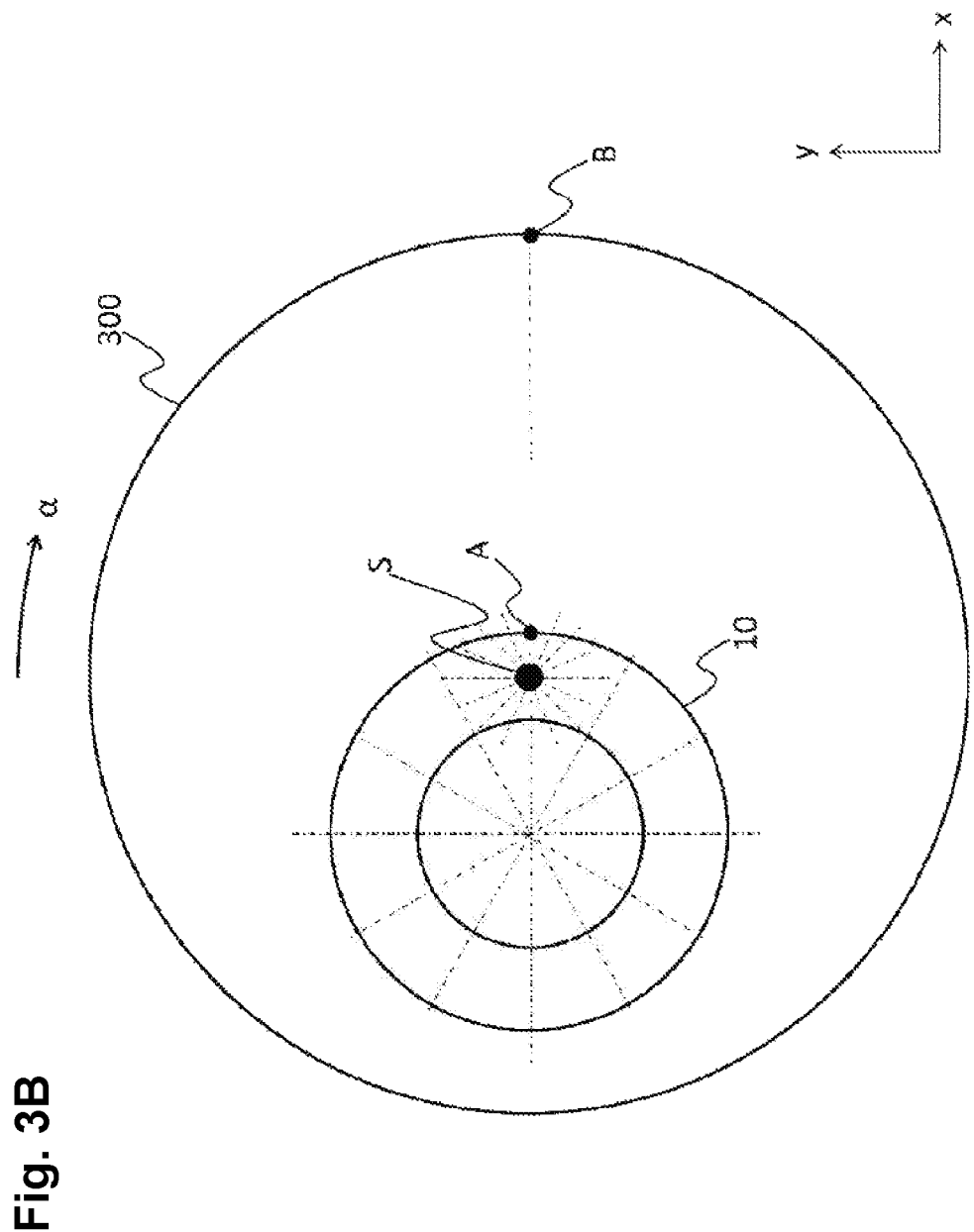
FIG. 3B is a top view showing a work turntable 300 for changing the positions on a molded article 10 that are irradiated with terahertz waves.

FIG. 3B shows a second state, in which the work turntable 300 is rotated about 90 degrees towards the direction indicated by the arrow α from the first state shown in FIG. 3A. The second state represents the molded article 10 placed at the first position on the work turntable 300, where the work turntable 300 is positioned in a second orientation (in which the point B is at the maximum x coordinate thereof).

Figure 3C:
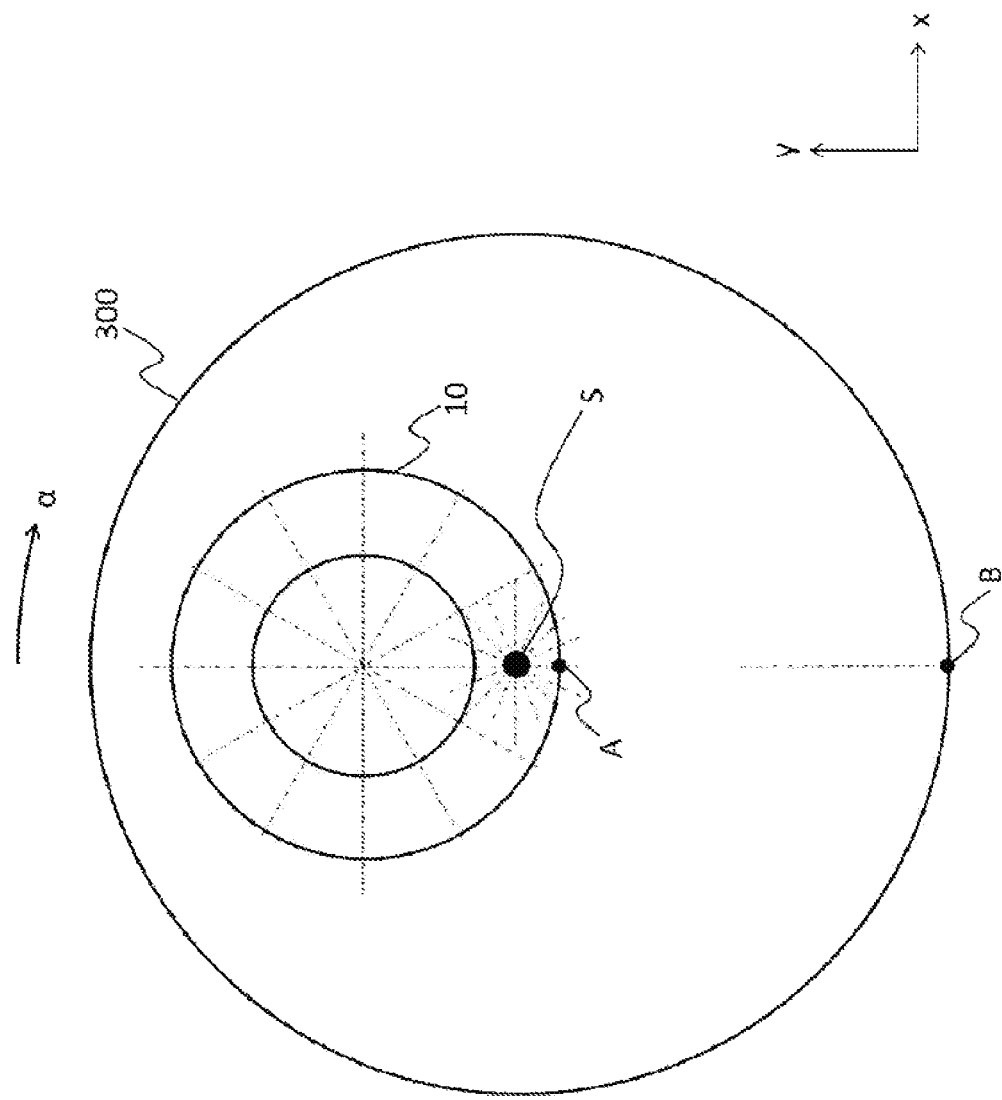
FIG. 3C is a top view showing a work turntable 300 for changing the positions on a molded article 10 that are irradiated with terahertz waves.

FIG. 3C shows a third state, in which the work turntable 300 is rotated about 90 degrees towards the direction indicated by the arrow α from the second state shown in FIG. 3B. The third state represents the molded article 10 placed at the first position on the work turntable 300, where the work turntable 300 is positioned in a third orientation (in which the point B is at the minimum y coordinate thereof).

Figure 3D:
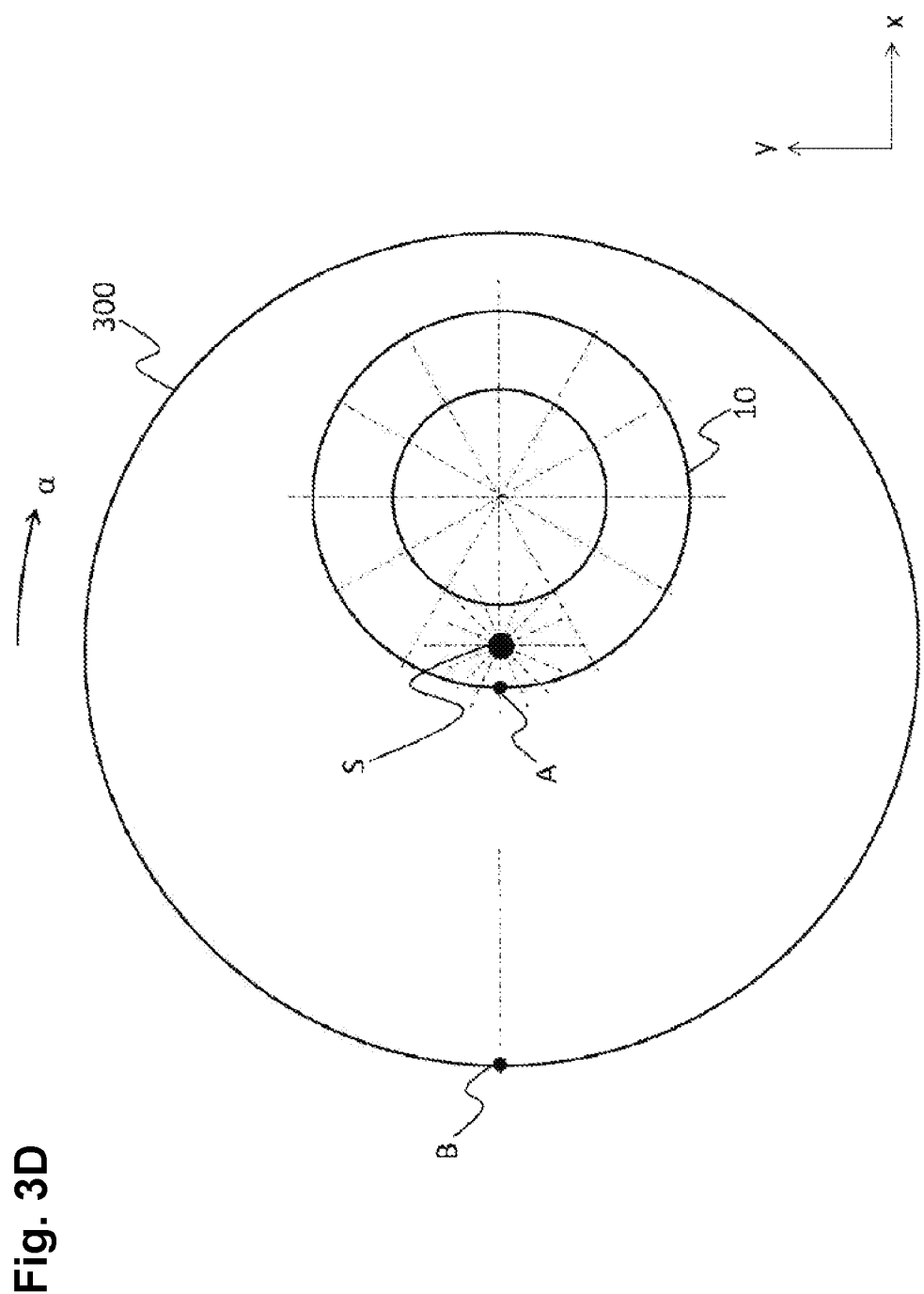
FIG. 3D is a top view showing a work turntable 300 for changing the positions on a molded article 10 that are irradiated with terahertz waves.

FIG. 3D shows a fourth state, in which the work turntable 300 is rotated about 90 degrees towards the direction indicated by the arrow α from the third state shown in FIG. 3C. The fourth state represents the molded article 10 placed at the first position on the work turntable 300, where the work turntable 300 is positioned in a fourth orientation (in which the point B is at the minimum x coordinate thereof).

Figure 3E:
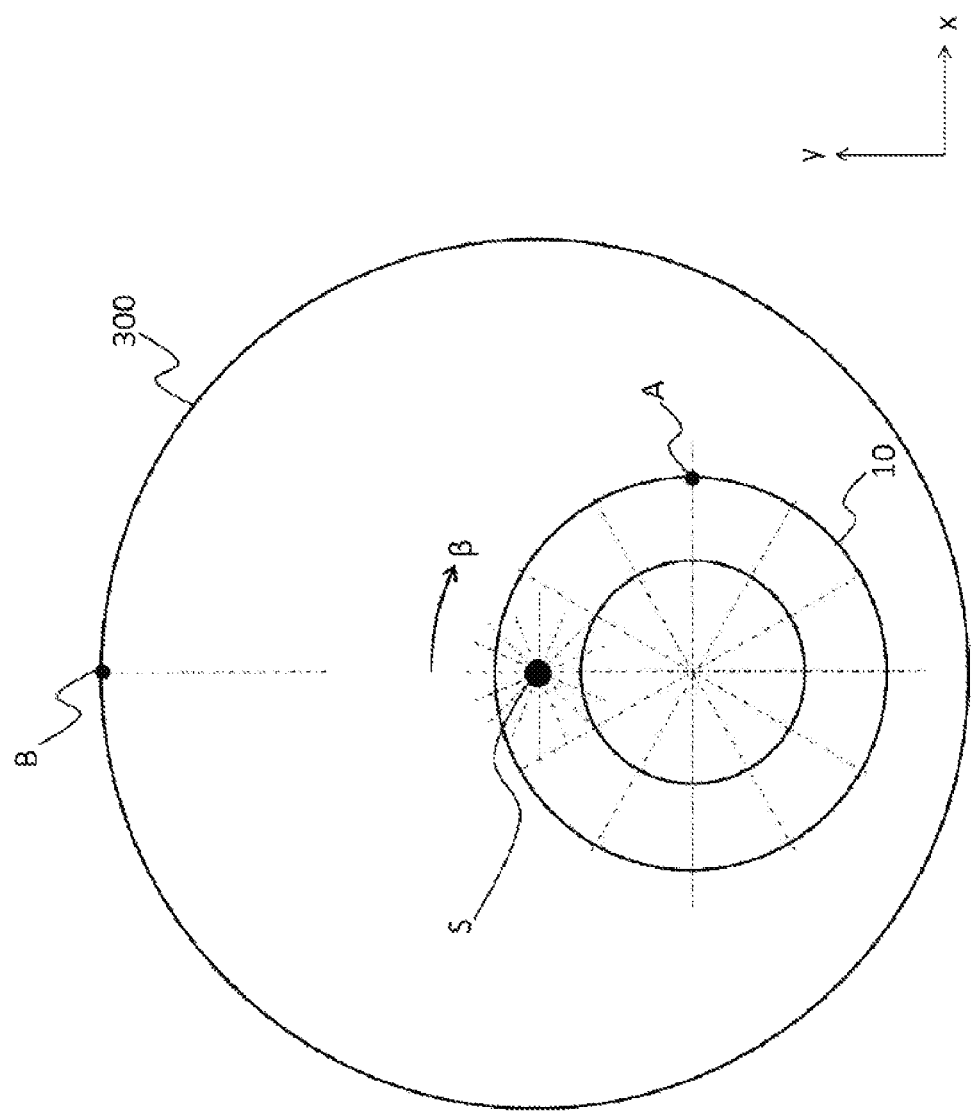
FIG. 3E is a top view showing a work turntable 300 for changing the positions on a molded article 10 that are irradiated with terahertz waves.

FIG. 3E shows a fifth state, in which the molded article 10 is rotated about 90 degrees towards the direction indicated by the arrow β from the first state shown in FIG. 3A. The fifth state represents the molded article 10 placed at a second position on the work turntable 300 (in which the point A is at the maximum x coordinate thereof), where the work turntable 300 is positioned in the first orientation. For example, the work turntable 300 can be rotated about 90 degrees, about 180 degrees, and about 270 degrees towards the direction indicated by the arrow α from the fifth state shown in FIG. 3E, thereby turning the state into a sixth state (where the molded article 10 is placed at the second position on the work turntable 300, and the work turntable 300 is positioned in the second orientation), a seventh state (where the molded article 10 is placed at the second position on the work turntable 300, and the work turntable 300 is positioned in the third orientation), and an eighth state (where the molded article 10 is placed at the second position on the work turntable 300, and the work turntable 300 is positioned in the fourth orientation).

Figure 3F:
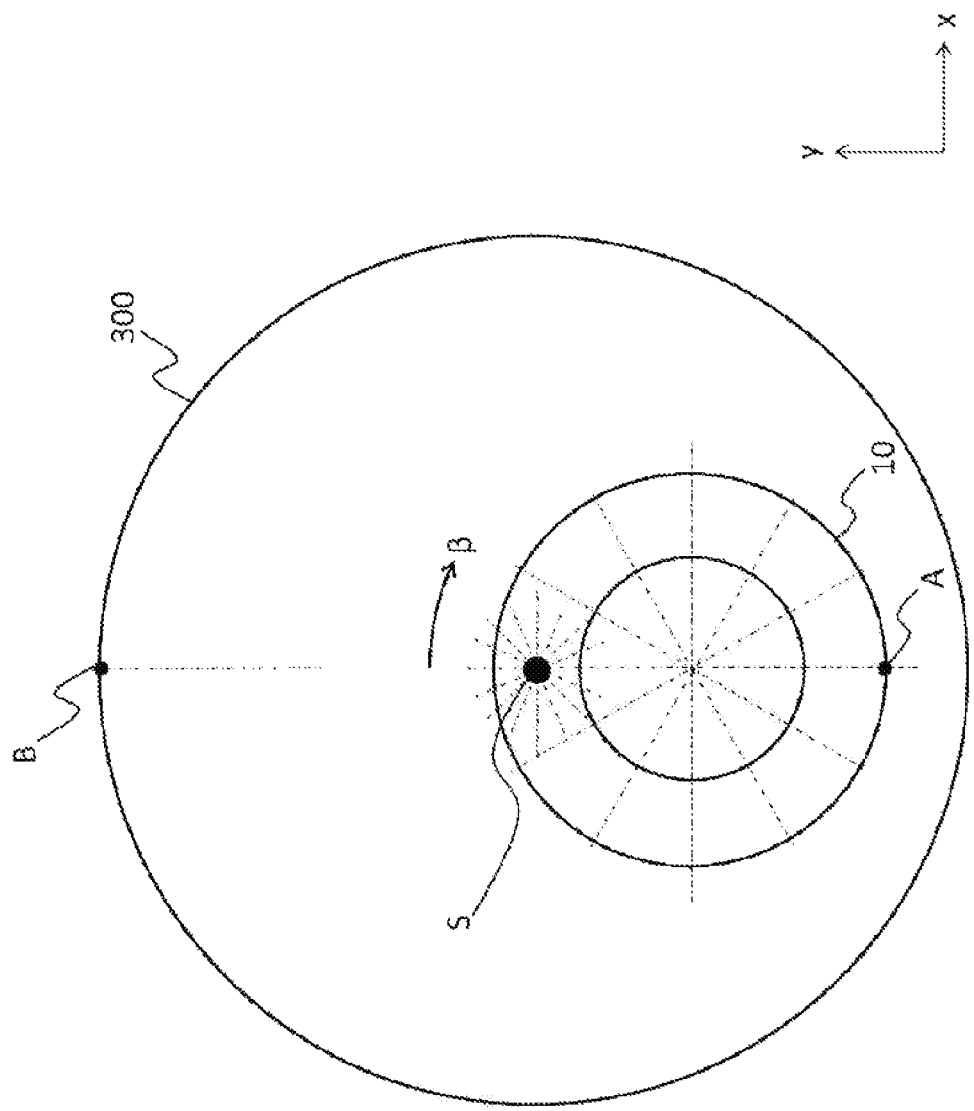
FIG. 3F is a top view showing a work turntable 300 for changing the positions on a molded article 10 that are irradiated with terahertz waves.

FIG. 3F shows a ninth state, in which the molded article 10 is rotated about 90 degrees towards the direction indicated by the arrow β from the fifth state shown in FIG. 3E. The ninth state represents the molded article 10 placed at a third position on the work turntable 300 (in which the point A is at the minimum y coordinate thereof), where the work turntable 300 is positioned in the first orientation. For example, the work turntable 300 can be rotated about 90 degrees, about 180 degrees, and about 270 degrees towards the direction indicated by the arrow α from the ninth state shown in FIG. 3F, thereby turning the state into a tenth state (where the molded article 10 is placed at the third position on the work turntable 300, and the work turntable 300 is positioned in the second orientation), an eleventh state (where the molded article 10 is placed at the third position on the work turntable 300, and the work turntable 300 is positioned in the third orientation), and a twelfth state (where the molded article 10 is placed at the third position on the work turntable 300, and the work turntable 300 is positioned in the fourth orientation).

Figure 3G:
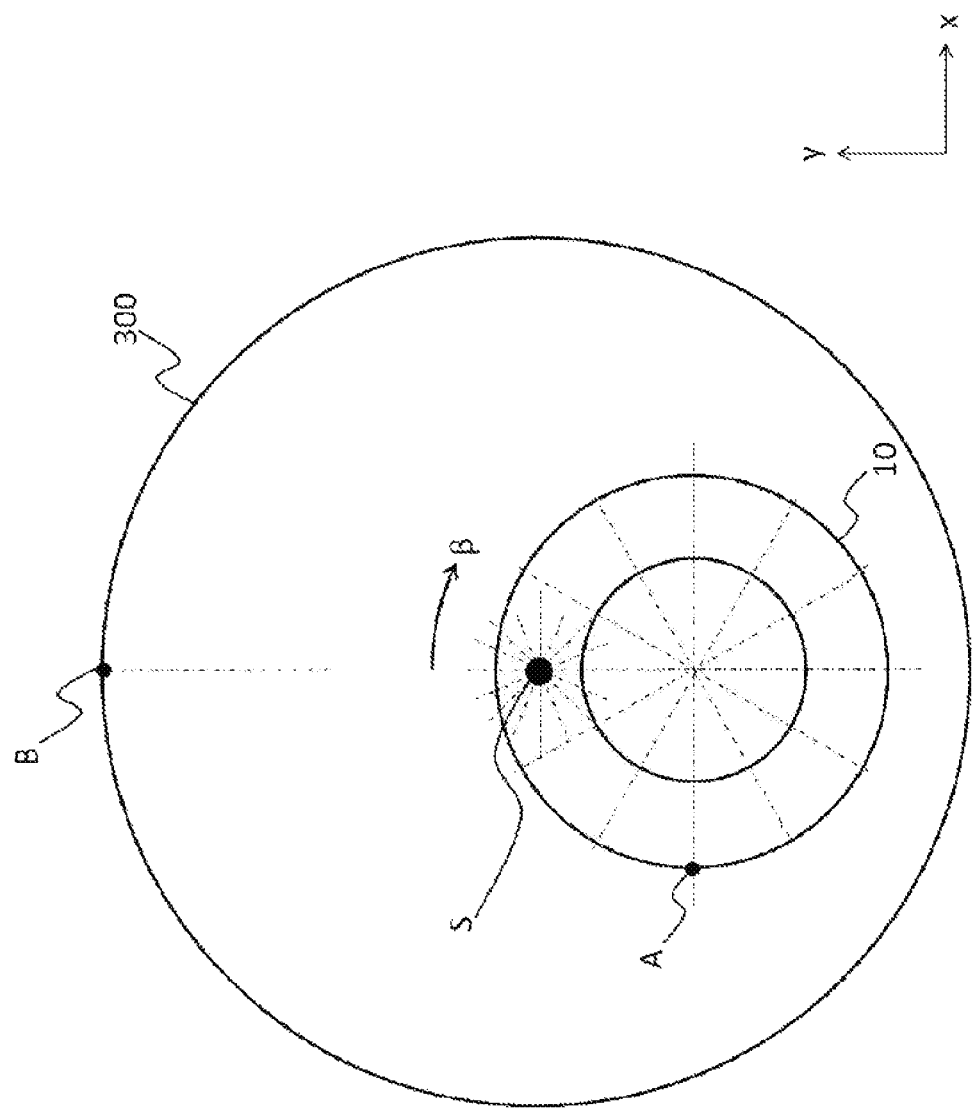
FIG. 3G is a top view showing a work turntable 300 for changing the positions on a molded article 10 that are irradiated with terahertz waves.

FIG. 3G shows a thirteenth state, in which the molded article 10 is rotated about 90 degrees towards the direction indicated by the arrow β from the ninth state shown in FIG. 3F. The thirteenth state represents the molded article 10 placed at a fourth position on the work turntable 300 (in which the point A is at the minimum x coordinate thereof), where the work turntable 300 is positioned in the first orientation. For example, the work turntable 300 can be rotated about 90 degrees, about 180 degrees, and about 270 degrees towards the direction indicated by the arrow α from the thirteenth state shown in FIG. 3F, thereby turning the state into a fourteenth state (where the molded article 10 is placed at the fourth position on the work turntable 300, and the work turntable 300 is positioned in the second orientation), an fifteenth state (where the molded article 10 is placed at the fourth position on the work turntable 300, and the work turntable 300 is positioned in the third orientation), and a sixteenth state (where the molded article 10 is placed at the fourth position on the work turntable 300, and the work turntable 300 is positioned in the fourth orientation).

The molded article 10 is irradiated with terahertz waves in each of the first to sixteenth states described above, and the transmitted terahertz waves are detected, so that the polarization intensities of the terahertz waves can be measured in each of the multiple orientations at each of the multiple positions.

In the above-mentioned example, the multiple positions refer to four positions on the hollow, generally-circular molded article 10, and the coordinates of the four positions can be represented as (a, 0), (−a, 0), (0, a), (0, −a), with the center of the generally-circular molded article 10 defined as the origin, where 0<a<r, with r representing the radius of the generally-circular molded article 10.

While the work turntable 300 is described to be rotated in increments of about 90 degrees in the above example, the present invention is not limited to this. For example, the work turntable 300 may be rotated at any angle increments other than about 90 degrees. For example, it is possible to rotate the work turntable 300 in increments of about 5 degrees, about 10 degrees, about 15 degrees, about 30 degrees, about 45 degrees, or about 60 degrees. In the case of the hollow generally-circular molded article 10 shown in FIGS. 3A to 3G, it is preferable to rotate the work turntable 300 in increments of about 90 degrees. This is because the peak (maximum value) of the polarization intensity of the terahertz waves appears every about 90 degrees with respect to the outer diameter direction in the case of the hollow generally-circular molded article 10 shown in FIGS. 3A to 3G, and thus, the molded article 10 is irradiated with terahertz waves in the orientation about the optical axis in increments of about 90 degrees, so that the properties of the molded article 10 can be efficiently analyzed and the load on the measurement can be kept small.

While the molded article 10 itself is described to be rotated on the work turntable 300 in increments of about 90 degrees in the above example, the present invention is not limited to this. For example, the molded article 10 itself may be rotated on the work turntable 300 at any angle increments other than about 90 degrees. For example, it is possible to rotate the molded article 10 itself on the work turntable 300 in increments of about 5 degrees, about 10 degrees, about 15 degrees, about 30 degrees, about 45 degrees, or about 60 degrees.

In this way, by using the terahertz wave light source 110 and the work turntable 300, it is possible to irradiate multiple positions on the molded article with the terahertz waves. Specifically, the terahertz wave light source 110 and the work turntable 300 constitute the irradiation means for irradiating multiple positions on a molded article with terahertz waves.

Referring back to FIG. 2, the computer system 130 may be connected to a database unit 200.

The database unit 200 may store results of terahertz wave polarization intensity measurements performed in the past. Alternatively, the database unit 200 may store results of analyzing the results of the terahertz wave polarization intensity measurements performed in the past.

Figure 4:
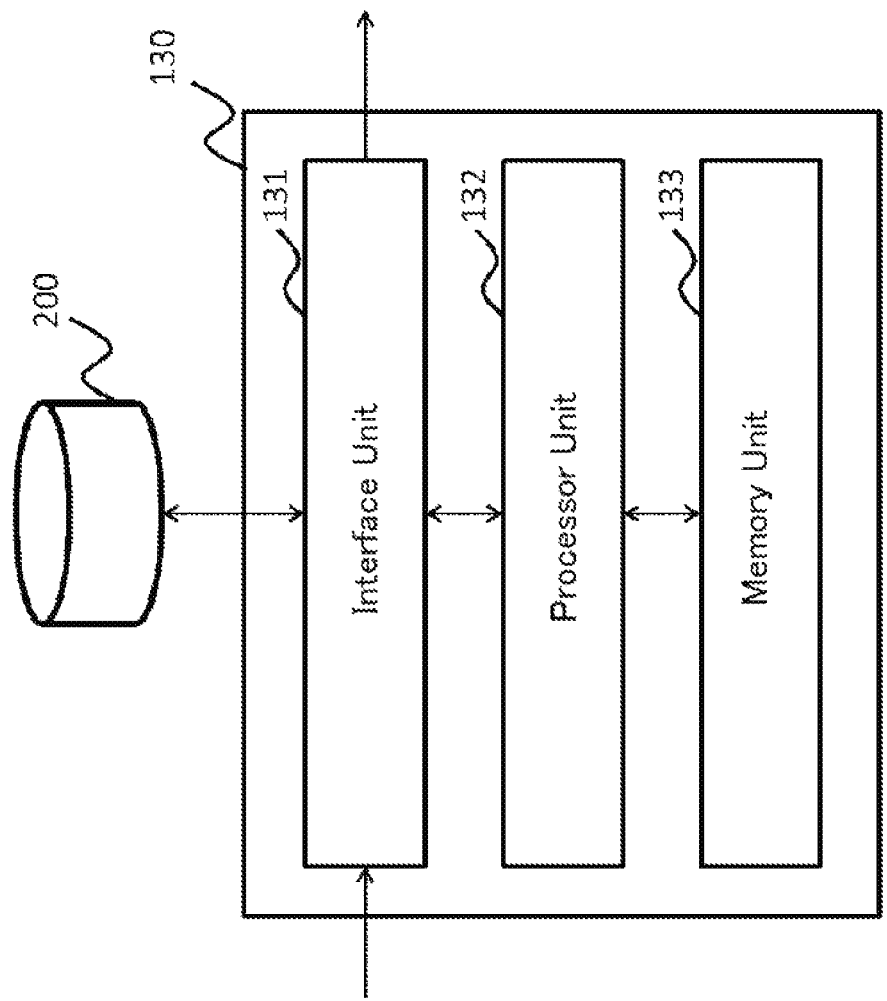
FIG. 4 is a diagram showing an example of a configuration of a computer system 130.

FIG. 4 shows an example of a configuration of a computer system 130.

The computer system 130 comprises an interface unit 131, a processor unit 132, and a memory unit 133.

The interface unit 131 exchanges information with the outside of the computer system 130. The processor unit 132 of the computer system 130 is capable of receiving information from the outside of the computer system 130 and is capable of transmitting information to the outside of the computer system 130, via the interface unit 131. The interface unit 131 can exchange information in any format.

The interface unit 131 can receive output signals from the terahertz wave detector 120. The interface unit 131 can output, to the outside of the computer system 130, the estimated convergence of changes in the dimensions of a molded article over time.

The interface unit 131 comprises, for example, an input unit that enables information to be input into the computer system 130. Any modes may be taken into consideration for the input unit to enable information to be input into the computer system 130. For example, if the input unit is a touch panel, the user may input information by touching the touch panel. Alternatively, if the input unit is a mouse, the user may input the information by operating the mouse. Alternatively, if the input unit is a keyboard, the user may enter information by pressing the keys on the keyboard. Alternatively, if the input unit is a microphone, the user may input information by inputting voice into the microphone. Alternatively, if the input unit is a data reader, the information may be input by reading the information from the storage medium connected to the computer system 130. Alternatively, if the input unit is a receiver, the receiver may receive information from the outside of the computer system 130 via the network thereby to input the information.

The interface unit 131 comprises, for example, an output unit that enables information to be output from the computer system 130. Any modes may be taken into consideration for the output unit to enable information to be output from the computer system 130. For example, if the output unit is a display screen, the information may be output on the display screen. Alternatively, if the output unit is a speaker, the information may be output by the voice from the speaker. Alternatively, if the output unit is a data writer, the information may be output by writing the information onto the storage medium connected to the computer system 130. Alternatively, if the output unit is a transmitter, the information may be output by the transmitter transmitting the information to the outside of the computer system 130 via the network.

The processor unit 132 executes the processing of the computer system 130 and controls the operation of the entire computer system 130. The processor unit 132 reads the program stored in the memory unit 133 and executes the program. This allows the computer system 130 to function as a system that executes desired steps. The processor unit 132 may be implemented by a single processor or by a plurality of processors. Here, the plurality of processors may be located in the same hardware component, or may be located in separate hardware components in the vicinity or remote.

The processor unit 132 can acquire the polarization intensity of the terahertz waves received from the terahertz wave detector 120 via the interface unit 131. Alternatively, the processor unit 132 may derive the polarization intensity of the terahertz waves by analyzing the output signal received from the terahertz wave detector 120 via the interface unit 131.

The processor unit 132 is configured to determine whether the polarization intensities of the terahertz waves at multiple positions on the molded article 10 are in a given relationship with each other. The given relationship may be a relationship derived from the results of the dimensional measurements of the molded article and the results of the terahertz wave polarization intensity measurements for the molded article performed in the past. The given relationship may vary in accordance with the shape and/or material of the molded article to be measured.

The given relationship includes, for example, a relationship in which the polarization intensity of the terahertz waves at one of the multiple positions on the molded article 10 correlates with the polarization intensity of the terahertz wave at another position of the multiple positions on the article 10. The correlation means that the correlation coefficient is greater than or equal to the threshold, and for example, the correlation coefficient may be one of about 0.99 or more, about 0.98 or more, about 0.97 or more, about 0.96 or more, about 0.95 or more, about 0.94 or more, about 0.93 or more, about 0.92 or more, about 0.91 or more, about 0.90 or more, about 0.85 or more, about 0.80 or more, about 0.75 or more, or about 0.70 or more.

The correlation coefficient, Correl (X, Y), is expressed as:

$$Correl(X, Y) = \frac{\sum (x - \bar{x})(y - \bar{y})}{\sqrt{\sum (x - \bar{x})^2 \sum (y - \bar{y})^2}}$$

where
$\bar{x}$
is an arithmetic mean of $\{x_i\}$, and
$\bar{y}$
is an arithmetic mean of $\{y_i\}$.

When multiple correlation coefficients can be calculated, the correlation may be defined as, for example, each of the plurality of correlation coefficients being greater than or equal to the threshold value, or the average value of the plurality of correlation coefficients being greater than or equal to the threshold value, or the median value of the plurality of correlation coefficients being greater than or equal to the threshold value, or the maximum or minimum value of the plurality of correlation coefficients being greater than or equal to the threshold value.

In one embodiment, the given relationship includes, for example, a relationship in which the polarization intensities of terahertz waves at multiple positions on the molded article 10, in one (e.g., the orientation of about zero degrees, the orientation of about 90 degrees, the orientation of about 180 degrees, or the orientation of about 270 degrees with the outer diameter direction of the generally circular molded article as the reference axis) of the multiple orientations with maximum polarization intensity (e.g., multiple orientations in increments of about 90 degrees with the outer diameter direction of the generally circular molded article as the reference axis), among the multiple orientations about the optical axis of the terahertz wave irradiation, correlates with the polarization intensities of terahertz waves at multiple positions on the molded article 10, in another one of the multiple orientations with maximum polarization intensity. The correlation means that the correlation coefficient is greater than or equal to the threshold, and for example, the correlation coefficient may be one of about 0.99 or more, about 0.98 or more, about 0.97 or more, about 0.96 or more, about 0.95 or more, about 0.94 or more, about 0.93 or more, about 0.92 or more, about 0.91 or more, about 0.90 or more, about 0.85 or more, about 0.80 or more, about 0.75 or more, or about 0.70 or more.

For example, assume that the polarization intensities shown in Table 1 are acquired when a certain, generally-circular resin molded article A (Day 20 after baking and cutting), in two orientations (zero degrees and 90 degrees with the outer diameter direction of the generally-circular resin molded article as the reference axis) and at four positions (a, 0), (−a, 0), (0, a), (0, −a) on the molded article, is irradiated with terahertz waves.

TABLE 1

|          |        | Orientation |            |
|----------|--------|-------------|------------|
|          |        | 0 degrees   | 90 degrees |
| Position | (0, a) | 0.002339    | 0.001901   |
|          | (a, 0) | 0.002167    | 0.001457   |
|          | (0, −a)| 0.002632    | 0.001915   |
|          | (−a, 0)| 0.002577    | 0.001797   |

In this instance, the correlation coefficient between the polarization intensities at multiple positions in the zero degrees orientation and the polarization intensities at multiple positions in the 90 degrees orientation is 0.7497.

Furthermore, assume that the polarization intensities shown in Table 2 are acquired when another certain, generally-circular resin molded article B (Day 50 after baking and cutting), in two orientations (zero degrees and 90 degrees with the outer diameter direction of the generally-circular resin molded article as the reference axis) and at four positions (a, 0), (−a, 0), (0, a), (0, −a) on the molded article, is irradiated with terahertz waves.

TABLE 2

|          |        | Orientation |            |
|----------|--------|-------------|------------|
|          |        | 0 degrees   | 90 degrees |
| Position | (0, a) | 0.00217     | 0.001446   |
|          | (a, 0) | 0.003128    | 0.002198   |
|          | (0, −a)| 0.002833    | 0.002035   |
|          | (−a, 0)| 0.003636    | 0.002634   |

In this instance, the correlation coefficient between the polarization intensities at multiple positions in the zero degrees orientation and the polarization intensities at multiple positions in the 90 degrees orientation is 0.9979.

Assuming that the correlation coefficient in a given relationship is 0.8 or more, the resin molded article A does not satisfy the given relationship, while the resin molded article B satisfies the given relationship.

When the diameters of the resin molded article A and resin molded article B were actually measured over time, the rate of change in diameter in the resin molded article A was greater than 0.03%, while the rate of change in diameter in the resin molded article B was less than 0.03%. Specifically, it can be said that the changes in the dimensions of the resin molded article B over time have reached the convergence.

For example, assume that the polarization intensities shown in Table 3 are acquired when a certain, generally-circular resin molded article A (Day 20 after baking and cutting), in four orientations (zero degrees, 90 degrees, 180 degrees and 270 degrees with the outer diameter direction of the generally-circular resin molded article as the reference axis) and at four positions (a, 0), (−a, 0), (0, a), (0, −a) on the molded article, is irradiated with terahertz waves.

TABLE 3

|          |        | Orientation |            |             |             |
|----------|--------|-------------|------------|-------------|-------------|
|          |        | 0 degrees   | 90 degrees | 180 degrees | 270 degrees |
| Position | (0, a) | 0.002339    | 0.001901   | 0.00172     | 0.002657    |
|          | (a, 0) | 0.002167    | 0.001457   | 0.0016      | 0.002405    |

TABLE 3-continued

|          |        | Orientation |            |             |             |
|----------|--------|-------------|------------|-------------|-------------|
|          |        | 0 degrees   | 90 degrees | 180 degrees | 270 degrees |
|          | (0, −a)| 0.002632    | 0.001915   | 0.00192     | 0.002451    |
|          | (−a, 0)| 0.002577    | 0.001797   | 0.001695    | 0.002697    |

In this instance, the correlation coefficient between the polarization intensities at multiple positions in the zero degrees orientation and the polarization intensities at multiple positions in the 90 degrees orientation is 0.7497. Furthermore, the correlation coefficient between the polarization intensities at multiple positions in the zero degrees orientation and the polarization intensities at multiple positions in the 180 degrees orientation is 0.7832; the correlation coefficient between the polarization intensities at multiple positions in the zero degrees orientation and the polarization intensities at multiple positions in the 270 degrees orientation is 0.3173; the correlation coefficient between the polarization intensities at multiple positions in the 90 degrees orientation and the polarization intensities at multiple positions in the 180 degrees orientation is 0.7662; the correlation coefficient between the polarization intensities at multiple positions in the 90 degrees orientation and the polarization intensities at multiple positions in the 270 degrees orientation is 0.3173; and the correlation coefficient between the polarization intensities at multiple positions in the 180 degrees orientation and the polarization intensities at multiple positions in the 270 degrees orientation is −0.1078.

The average value of these correlation coefficients is 0.4710.

Furthermore, assume that the polarization intensities shown in Table 4 are acquired when another certain, generally-circular resin molded article B (Day 50 after baking and cutting), in four orientations (zero degrees, 90 degrees, 180 degrees and 270 degrees with the outer diameter direction of the generally-circular resin molded article as the reference axis) and at four positions (a, 0), (−a, 0), (0, a), (0, −a) on the molded article, is irradiated with terahertz waves.

TABLE 4

|          |        | Orientation |            |             |             |
|----------|--------|-------------|------------|-------------|-------------|
|          |        | 0 degrees   | 90 degrees | 180 degrees | 270 degrees |
| Position | (0, a) | 0.00217     | 0.001446   | 0.001601    | 0.001009    |
|          | (a, 0) | 0.003128    | 0.002198   | 0.001886    | 0.001326    |
|          | (0, −a)| 0.002833    | 0.002035   | 0.002144    | 0.001431    |
|          | (−a, 0)| 0.003636    | 0.002634   | 0.002707    | 0.001681    |

In this instance, the correlation coefficient between the polarization intensities at multiple positions in the zero degrees orientation and the polarization intensities at multiple positions in the 90 degrees orientation is 0.9979. Furthermore, the correlation coefficient between the polarization intensities at multiple positions in the zero degrees orientation and the polarization intensities at multiple positions in the 180 degrees orientation is 0.8811; the correlation coefficient between the polarization intensities at multiple positions in the zero degrees orientation and the polarization intensities at multiple positions in the 270 degrees orientation is 0.9382; the correlation coefficient between the polarization intensities at multiple positions in the 90 degrees orientation and the polarization intensities at multiple positions in the 180 degrees orientation is 0.9010; the correlation coefficient between the polarization intensities at multiple positions in the 90 degrees orientation and the polarization intensities at multiple positions in the 270 degrees orientation is 0.9579; and the correlation coefficient between the polarization intensities at multiple positions in the 180 degrees orientation and the polarization intensities at multiple positions in the 270 degrees orientation is 0.9684.

The average value of these correlation coefficients is 0.9408.

Assuming that the correlation coefficient in a given relationship is 0.8 or more, the resin molded article A does not satisfy the given relationship, while the resin molded article B satisfies the given relationship.

As described above, when the diameters of the resin molded article A and resin molded article B were actually measured over time, the rate of change in diameter in the resin molded article A was greater than 0.03%, while the rate of change in diameter in the resin molded article B was less than 0.03%. Specifically, it can be said that the changes over time in the dimensions of the resin molded article B have reached the convergence.

In one embodiment, the given relationship includes, for example, a relationship in which the polarization intensities of terahertz waves at multiple positions on the resin molded article 10, in one of adjacent orientations (e.g., the orientation of about zero degrees and the orientation of about 90 degrees, the orientation of about 90 degrees and the orientation of about 180 degrees, the orientation of about 180 degrees and the orientation of about 270 degrees, or the orientation of about 270 degrees and the orientation of about zero degrees, with the outer diameter direction of the generally-circular resin molded article as the reference axis) of the multiple orientations with maximum polarization intensity (e.g., multiple orientations in increments of about 90 degrees with the outer diameter direction of the generally-circular resin molded article as the reference axis) among the multiple orientations about the optical axis of the terahertz wave irradiation, correlates with the polarization intensities of terahertz waves at multiple positions on the resin molded article 10 in another one of the adjacent orientations among the multiple orientations with maximum polarization intensity. The correlation means that the correlation coefficient is greater than or equal to the threshold, and for example, the correlation coefficient may be one of about 0.99 or more, about 0.98 or more, about 0.97 or more, about 0.96 or more, about 0.95 or more, about 0.94 or more, about 0.93 or more, about 0.92 or more, about 0.91 or more, about 0.90 or more, about 0.85 or more, about 0.80 or more, about 0.75 or more, or about 0.70 or more.

For example, assume that the polarization intensities shown in Table 3 above are acquired when a certain, generally-circular resin molded article A (Day 20 after baking and cutting), in four orientations (zero degrees, 90 degrees, 180 degrees and 270 degrees with the outer diameter direction of the generally-circular resin molded article as the reference axis) and at four positions (a, 0), (−a, 0), (0, a), (0, −a) on the molded article, is irradiated with terahertz waves.

In this instance, the correlation coefficient between the polarization intensities at multiple positions in the zero degrees orientation and the polarization intensities at multiple positions in the 90 degrees orientation is 0.7497. Furthermore, the correlation coefficient between the polarization intensities at multiple positions in the 90 degrees orientation and the polarization intensities at multiple positions in the 180 degrees orientation is 0.7662; the correlation coefficient between the polarization intensities at multiple positions in the 180 degrees orientation and the polarization intensities at multiple positions in the 270 degrees orientation is −0.1078; and the correlation coefficient between the polarization intensities at multiple positions in the 270 degrees orientation and the polarization intensities at multiple positions in the zero degrees orientation is 0.3173.

The average value of these correlation coefficients is 0.4314.

Furthermore, assume that the polarization intensities shown in Table 4 are acquired when another certain, generally-circular resin molded article B (Day 50 after baking and cutting), in four orientations (zero degrees, 90 degrees, 180 degrees and 270 degrees with the outer diameter direction of the generally-circular resin molded article as the reference axis) and at four positions (a, 0), (−a, 0), (0, a), (0, −a) on the molded article, is irradiated with terahertz waves.

In this instance, the correlation coefficient between the polarization intensities at multiple positions in the zero degrees orientation and the polarization intensities at multiple positions in the 90 degrees orientation is 0.9979. Furthermore, the correlation coefficient between the polarization intensities at multiple positions in the 90 degrees orientation and the polarization intensities at multiple positions in the 180 degrees orientation is 0.9010; the polarization intensities at multiple positions in the 180 degrees orientation and the polarization intensities at multiple positions in the 270 degrees orientation is 0.9684; and the polarization intensities at multiple positions in the 270 degrees orientation and the polarization intensities at multiple positions in the zero degrees orientation is 0.9382.

The average value of these correlation coefficients is 0.9513.

Assuming that the correlation coefficient in a given relationship is 0.8 or more, the resin molded article A does not satisfy the given relationship, while the resin molded article B satisfies the given relationship.

As described above, when the diameters of the resin molded article A and resin molded article B were actually measured over time, the rate of change in diameter in the resin molded article A was greater than 0.03%, while the rate of change in diameter in the resin molded article B was less than 0.03%. Specifically, it can be said that the changes over time in the dimensions of the resin molded article B have reached the convergence.

Accordingly, the processor unit 132 determines whether the polarization intensities of the terahertz waves at multiple positions on the molded article 10 are in a given relationship with each other, which allows estimating of the convergence of changes in the dimensions of the molded article over time.

The memory unit 133 stores the program required to execute the processing of the computer system 130, the data required to execute the program, and the like. The memory unit 133 may store a program for causing the processor unit 132 to perform processing for estimating the convergence of changes in the dimensions of a molded article over time (e.g., the program for enabling the processing shown in FIG. 6 described below). Herein, any means may be taken into consideration for the way of storing the program onto the memory unit 133. For example, the program may be pre-installed in the memory unit 133. Alternatively, the program may be installed in the memory unit 133 by being downloaded via the network. In this case, any types of network may be taken into consideration. The memory unit 133 may be implemented by any storage means.

The database unit 200 may store results of terahertz wave polarization intensity measurements performed in the past. Alternatively, the database unit 200 may store results of analyzing the results of the terahertz wave polarization intensity measurements performed in the past.

For example, the database unit 200 stores the polarization intensity measured by the terahertz wave detector 120, and the position on the molded article 10 and the orientation about the optical axis at that time, in association with each other.

For example, the database unit 200 stores a result of terahertz wave polarization intensity measurement when the changes in the dimensions of the molded article 10 over time are yet to reach the convergence (e.g., a correlation coefficient between the polarization intensity of the terahertz wave at one of multiple positions on the molded article 10 and the polarization intensity of the terahertz waves at another position of the multiple positions on the molded article 10) and a result of terahertz wave polarization intensity measurement when the changes in the dimensions of the molded article 10 over time reach the convergence (e.g., a correlation coefficient between the polarization intensity of the terahertz waves at one of multiple positions on the molded article 10 and the polarization intensity of the terahertz waves at another position of the multiple positions on the molded article 10).

The processor unit 132 can derive a given relationship (for example, the threshold value of the correlation coefficient) for estimating the convergence of changes in the dimensions of the molded article 10 over time by utilizing the data stored in the database unit 200. Alternatively, the given relationship may be defined by prior experiments.

For example, the database unit 200 may store polarization intensity measured by the terahertz wave detector 120, and compressive force applied to the molded article 10 at that time, in association with each other. This is a result of terahertz wave polarization intensity measurement performed in each state where multiple strengths of compressive force are applied to the molded article 10.

The processor unit 132 can derive the relationship between the polarization intensity and the compressive force applied to the molded article 10 (e.g., the calibration curve) by utilizing the data stored in the database unit 200. Alternatively, the relationship between the polarization intensity and the compressive force applied to the molded article 10 may be defined by prior experiments.

For example, the database unit 200 may store polarization intensity measured by the terahertz wave detector 120, and tensile force applied to the molded article 10 at that time, in association with each other. This is a result of terahertz wave polarization intensity measurement performed in each state where multiple strengths of tensile force are applied to the molded article 10.

The processor unit 132 can derive the relationship between the polarization intensity and the tensile force applied to the molded article 10 (e.g., the calibration curve) by utilizing the data stored in the database unit 200. Alternatively, the relationship between the polarization intensity and the tensile force applied to the molded article 10 may be defined by prior experiments.

For example, the database unit 200 may store polarization intensity measured by the terahertz wave detector 120, and the ratio of mixture mixed in the molded article 10 at that time, in association with each other. The mixture is a filler other than the material (e.g., resin) that mainly constitutes the molded article 10, and includes, for example, fiber-based materials, ceramic-based materials, oxides, and the like. The mixture specifically includes, but is not limited to, carbon C, glass fiber, carbon fiber, and molybdenum. The database unit 200 may store a result of terahertz wave polarization intensity measurement performed on each of the molded articles 10 in which a mixture (e.g., carbon C) is mixed in multiple ratios.

The processor unit 132 can derive the relationship (e.g., the calibration curve) between the polarization intensity and the ratio of the mixture mixed in the molded article 10 by utilizing the data stored in the database unit 200. Alternatively, the relationship between the polarization intensity and the ratio of the mixture mixed in the molded article 10 may be defined by prior experiments.

While the measurement of the polarization intensity of the terahertz waves by detecting the terahertz wave transmitted through the molded article 10 using the terahertz wave detector 120 is described in the above example, the present invention is not limited to this. Also within the scope of the present invention is the measurement of the polarization intensity of the terahertz waves by detecting the terahertz waves reflected from the molded article 10 using the terahertz wave detector. The terahertz wave detector for detecting the terahertz waves reflected from the molded article 10 may have a configuration similar to that of the terahertz wave detector 120 for detecting the terahertz waves transmitted through the molded article 10.

While the database unit 200 is provided outside the computer system 130 in the examples shown in FIGS. 2 and 4, the present invention is not limited to this. It is also possible to provide at least part of the database unit 200 inside the computer system 130. In such a configuration, at least part of the database unit 200 may be implemented by the same storage means as the storage means for implementing the memory unit 133, or it may be implemented by a storage means different from the storage means for implementing the memory unit 133. In any case, at least part of the database unit 200 is configured as a storage unit for the computer system 130. The configuration of the database unit 200 is not limited to a specific hardware configuration. For example, the database unit 200 may be composed of a single hardware component, or may be composed of a plurality of hardware components. For example, the database unit 200 may be configured as an external hard disk device of the system 100, or may be configured as a storage on a cloud connected via a network.

Note that each component of the computer system 130 may be composed of a single hardware component or may be composed of a plurality of hardware components. When each component is composed of a plurality of hardware components, any modes may be taken into consideration for connecting respective hardware components. The respective hardware components may be connected wirelessly or by wire with each other. The computer system 130 is not limited to a specific hardware configuration. Also within the scope of the present invention is a configuration of the processor unit 132 with an analog circuit instead of a digital circuit. The configuration of the system 100 of the present invention is not limited to such a configuration as described above, and any configurations that can achieve the functions thereof may be used.

Figure 5A:
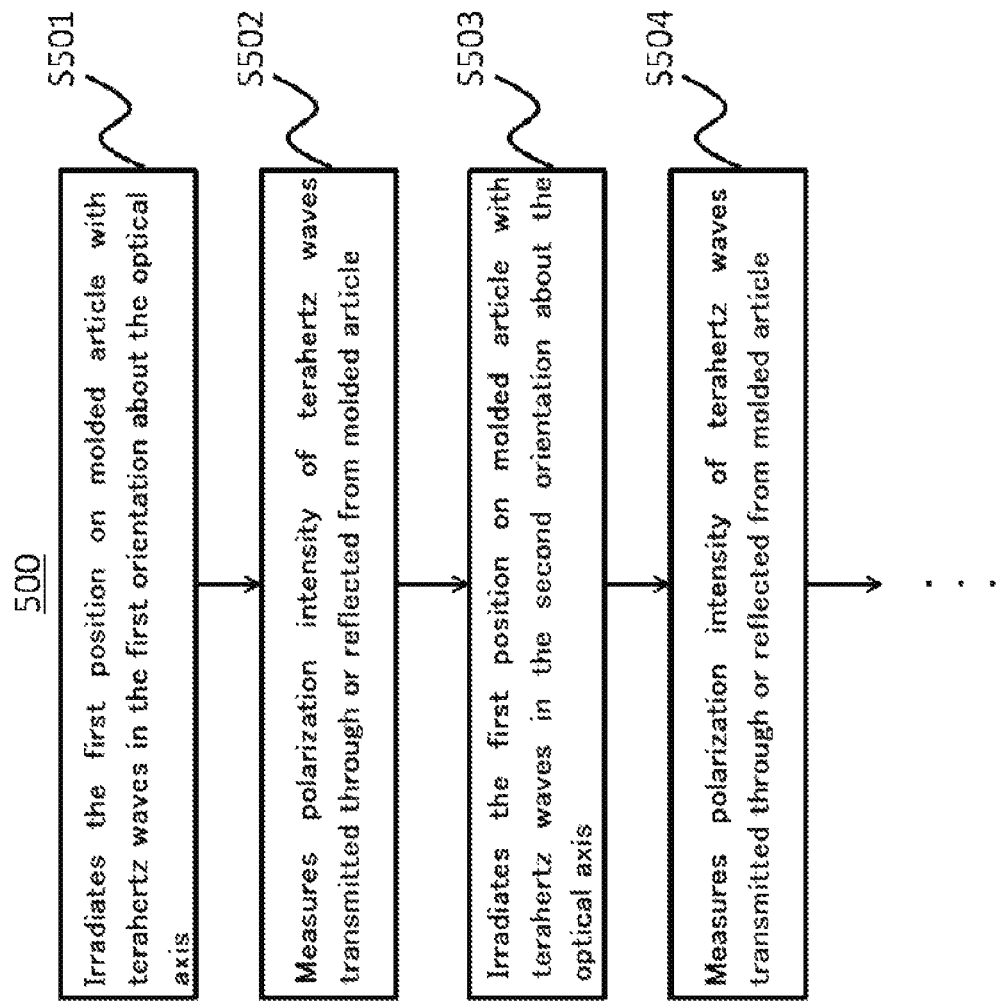
FIG. 5A is a flowchart showing an example for a procedure 500 for estimating the convergence of changes in the dimensions of a molded article over time.
Figure 5B:
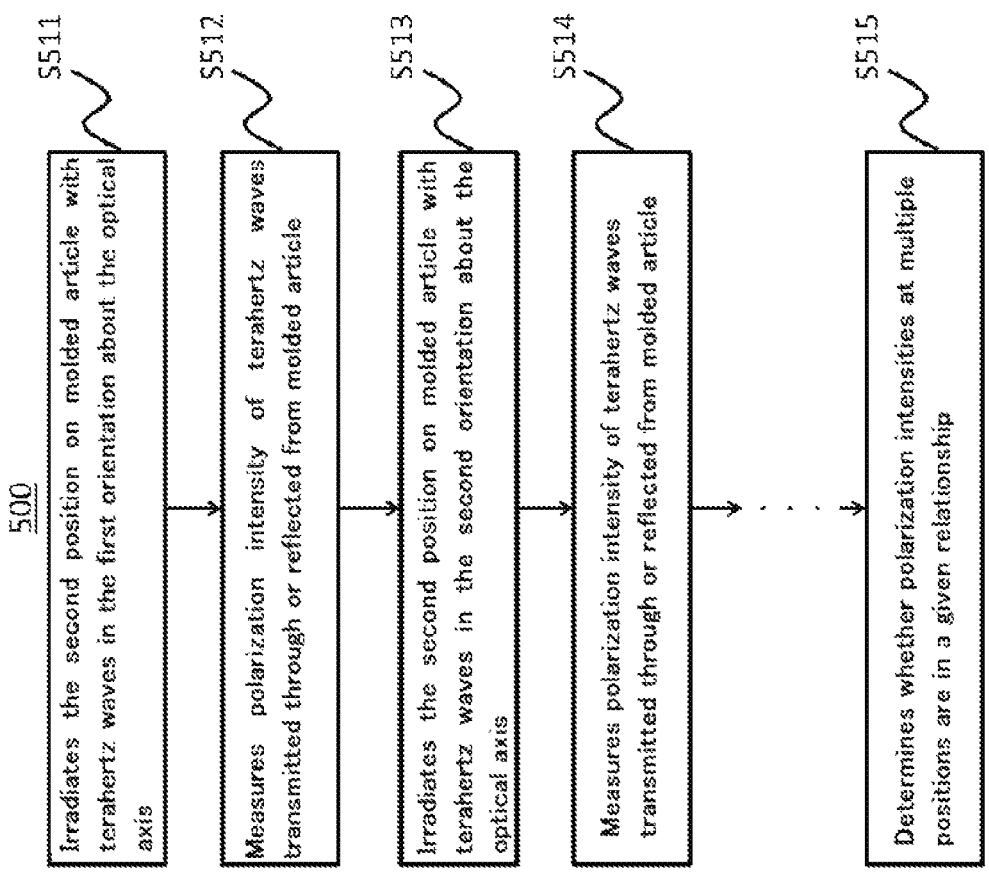
FIG. 5B is a flowchart showing an example for a procedure 500 for estimating the convergence of changes in the dimensions of a molded article over time.

FIGS. 5A and 5B show an example for a procedure 500 for estimating the convergence of changes in the dimensions of a molded article over time. The procedure 500 is performed using the system 100.

In step S501, the terahertz wave light source 110 irradiates the first position on the molded article 10 with the terahertz waves in the first orientation about the optical axis.

It step S502, the terahertz wave detector 120 measures the polarization intensity of the terahertz waves transmitted through or reflected from the molded article 10. Alternatively, the polarization intensity of the terahertz waves may be derived by analyzing the output signals output from the terahertz wave detector 120 by the computer system 130.

The polarization intensity measured in step S502 is stored in the database unit 200 in association with the position thereof on the molded article 10 and the orientation about the optical axis. Alternatively, the measured polarization intensity is transmitted to the computer system 130 in association with the position thereof on the molded article 10 and the orientation about the optical axis.

In step S503, the terahertz wave light source 110 irradiates the first position on the molded article 10 with the terahertz waves in the second orientation about the optical axis. For example, the work turntable 300 on which the molded article 10 is placed can be rotated to change the orientation about the optical axis, and then the molded article 10 can be irradiated with the terahertz waves in the second orientation about the optical axis.

In step S504, the terahertz wave detector 120 measures the polarization intensity of the terahertz waves transmitted through or reflected from the molded article 10. Alternatively, the polarization intensity of the terahertz waves may be derived by analyzing the output signals output from the terahertz wave detector 120 by the computer system 130.

The polarization intensity measured in step S504 is stored in the database unit 200 in association with the position thereof on the molded article 10 and the orientation about the optical axis. Alternatively, the measured polarization intensity is transmitted to the computer system 130 in association with the position thereof on the molded article 10 and the orientation about the optical axis.

Thereafter, the step of the terahertz wave irradiation and the step of the polarization intensity measurement of the terahertz waves continue until the polarization intensity of the terahertz waves is measured in all of the multiple orientations about the optical axis.

When the polarization intensity of the terahertz wave is measured in all of the multiple orientations about the optical axis, the procedure proceeds to step S511.

In step S511, the terahertz wave light source 110 irradiates the second position on the molded article 10 with the terahertz waves in the first orientation about the optical axis. For example, the position and/or orientation of the molded article 10 with respect to the work turntable 300 can be changed to change the position on the molded article 10 that is irradiated with the terahertz wave, and then the molded article 10 can be irradiated with the terahertz waves at the second position.

In step S512, the terahertz wave detector 120 measures the polarization intensity of the terahertz waves transmitted through or reflected from the molded article 10. Alternatively, the polarization intensity of the terahertz waves may be derived by analyzing the output signals output from the terahertz wave detector 120 by the computer system 130.

The polarization intensity measured in step S512 is stored in the database unit 200 in association with the position thereof on the molded article 10 and the orientation about the optical axis. Alternatively, the measured polarization intensity is transmitted to the computer system 130 in association with the position thereof on the molded article 10 and the orientation about the optical axis.

In step S513, the terahertz wave light source 110 irradiates the second position on the molded article 10 with the terahertz waves in the second orientation about the optical axis. For example, the work turntable 300 on which the molded article 10 is placed can be rotated to change the orientation about the optical axis, and then the molded article 10 can be irradiated with the terahertz waves in the second orientation about the optical axis.

In step S514, the terahertz wave detector 120 measures the polarization intensity of the terahertz waves transmitted through or reflected from the molded article 10. Alternatively, the polarization intensity of the terahertz waves may be derived by analyzing the output signals output from the terahertz wave detector 120 by the computer system 130.

The polarization intensity measured in step S514 is stored in the database unit 200 in association with the position thereof on the molded article 10 and the orientation about the optical axis. Alternatively, the measured polarization intensity is transmitted to the computer system 130 in association with the position thereof on the molded article 10 and the orientation about the optical axis.

Thereafter, the step of the terahertz wave irradiation and the step of the polarization intensity measurement of the terahertz waves continue until the polarization intensity of the terahertz waves is measured in all of the multiple orientations about the optical axis.

When the polarization intensity of the terahertz waves is measured in all of the multiple orientations about the optical axis, the procedure proceeds to step S515.

In step S515, the computer system 130 determines whether the polarization intensities at multiple positions are in a given relationship. The computer system 130 can estimate that dimensional changes in the molded article 10 over time have reached the convergence when the polarization intensities at the multiple positions are in a given relationship, while the computer system 130 can estimate that dimensional changes in the molded article 10 over time have yet to reach the convergence when the polarization intensities at the multiple positions are not in the given relationship.

While the measurement of the polarization intensity of the terahertz waves by irradiating two positions (first and second positions) on the molded article 10 with the terahertz waves is described in the above example, the measurement of the polarization intensity may also be measured by irradiating n-numbered (where n is an integer greater than or equal to 3) positions with the terahertz wave. In this case, prior to step S515, the step of the terahertz wave irradiation and the step of the polarization intensity measurement of the terahertz waves are performed on the n-numbered positions with regard to each of the multiple orientations about the optical axis.

While the procedure 500 is described to be performed in a specific order in the above example, the order of each step in the procedure 500 is not limited to that described above. Each step of the procedure 500 can be performed in any logically possible order.

Figure 6:
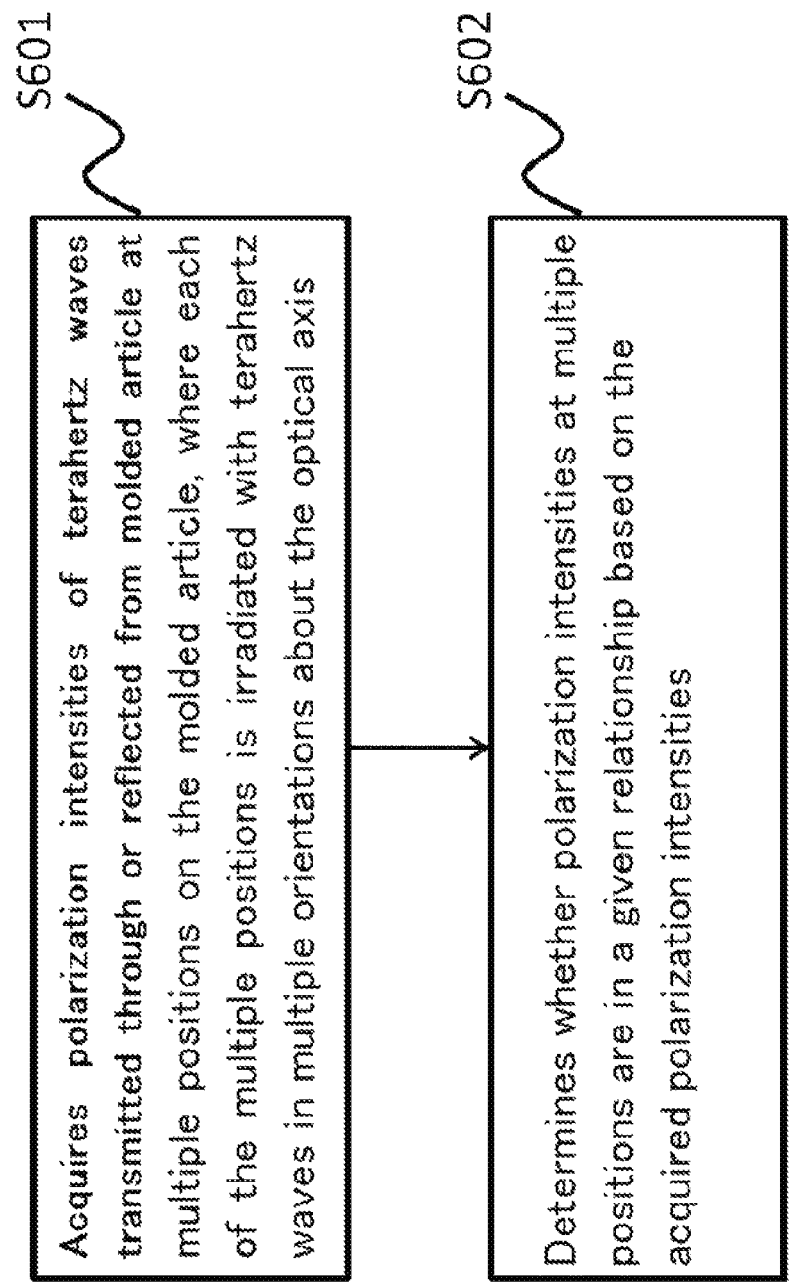
FIG. 6 is a flowchart showing an example of processing 600 by a computer system for estimating the convergence of changes in the dimensions of a molded article over time.

FIG. 6 shows an example of processing 600 by a computer system for estimating the convergence of changes in the dimensions of a molded article over time. The processing 600 is performed in the processor unit 132 of the computer system 130.

In step S601, the processor unit 132 acquires polarization intensities of the terahertz waves transmitted through or reflected from a molded article at multiple positions on the molded article, via an interface unit 131, where each of the multiple positions is irradiated with the terahertz waves in multiple orientations about the optical axis. The acquired polarization intensities are the polarization intensities acquired in steps S501 to S514 described above with reference to FIGS. 5A and 5B.

The processor unit 132 can acquire the polarization intensities received from the terahertz wave detector 120 via the interface unit 131. Alternatively, the processor unit 132 can acquire the polarization intensities received from the database unit 200 via the interface unit 131.

In step S602, the processor unit 132 determines whether the polarization intensities at the multiple positions are in a given relationship based on the polarization intensities acquired in step S601. The given relationship may be a relationship derived from the results of the dimensional measurements of the article and the results of terahertz wave polarization intensity measurements on the article performed in the past.

The given relationship includes, for example, a relationship in which the polarization intensity of the terahertz waves at one of the multiple positions on the molded article 10 correlates with the polarization intensity of the terahertz waves at another position of the multiple positions on the article 10. The correlation means that the correlation coefficient is greater than or equal to the threshold.

In one embodiment, the given relationship includes, for example, a relationship in which the polarization intensities of terahertz waves at multiple positions on the molded article 10, in one of the multiple orientations with maximum polarization intensity, among the multiple orientations about the optical axis of the terahertz wave irradiation, correlates with the polarization intensities of terahertz waves at multiple positions on the molded article 10, in another one of the multiple orientations with maximum polarization intensity.

In one embodiment, the given relationship includes, for example, a relationship in which the polarization intensities of terahertz waves at multiple positions on the molded article 10, in one of adjacent orientations of the multiple orientations with maximum polarization intensity among the multiple orientations about the optical axis of the terahertz wave irradiation, correlates with the polarization intensities of terahertz waves at multiple positions on the molded article 10 in another one of the adjacent orientations among the multiple orientations with maximum polarization intensity.

The processor unit 132 can determine whether the polarization intensities of the terahertz waves at multiple positions on the molded article 10 are in a given relationship with each other, which allows estimating of the convergence of changes in the dimensions of the molded article over time.

In another embodiment, in addition to or in place of step S602, the processor unit 132 can estimate the compressive force or tensile force being applied to the molded article 10 in step S603, based on the polarization intensities acquired in step S601. The processor unit 132 can estimate the compressive force or tensile force being applied to the molded article 10 based, for example, on the relationship (e.g., the calibration curve) between the polarization intensity derived from the past terahertz wave polarization intensity measurement results stored in the database unit 200 and the compressive force being applied to the molded article. Alternatively, the processor unit 132 can estimate the compressive force or tensile force being applied to the molded article 10 based, for example, on the relationship (e.g., the calibration curve) between the polarization intensity defined by prior experiments and the compressive force being applied to the molded article. Accordingly, performing the terahertz wave polarization intensity measurement allows estimating of the compressive force or tensile force being applied to molded article 10, which expands the range of applications for the terahertz wave.

In another embodiment, in addition to or in place of step S602, or in addition to or in place of step S603, the processor unit 132 can estimate the ratio of the mixture mixed in the molded article 10 based on the polarization intensities acquired in step S601. The mixture is carbon C, for example. The processor unit 132 can estimate the ratio of the mixture mixed in the molded article 10 based, for example, on the relationship (e.g., the calibration curve) between the polarization intensities derived from the past terahertz wave polarization intensity measurement results stored in the database unit 200 and the ratio of the mixture mixed in the molded article. Alternatively, the processor unit 132 can estimate the ratio of the mixture mixed in the molded article 10 based, for example, on the relationship (e.g., the calibration curve) between the polarization intensity defined by prior experiments and the mixture mixed in the molded article. Accordingly, performing the terahertz wave polarization intensity measurement allows estimating of the ratio of the mixture mixed in the molded article 10, which expands the range of applications for the terahertz wave.

While the processing of each step shown in FIG. 6 is described to be achieved by the processor unit 132 and the program stored in the memory unit 133 in the example described above with reference to FIG. 6, the present invention is not limited to this. At least one of the processes in the steps shown in FIG. 6 may be achieved by a hardware configuration, such as a control circuit.

EXAMPLES (Terahertz Wave Polarization Intensity Measurement Experiment 1 on Hollow Generally-Circular PTFE)

Terahertz wave polarization intensity measurement experiment was performed on hollow generally-circular PTFE.

The hollow generally-circular PTFE had dimensions of 20.4 mm in outer diameter, 6.4 mm in inner diameter, and 3.0 mm in thickness. As to the PTFE, such PTFE on Day 1 after the baking and cutting was used. A T-Ray® 5000 HTS4002 Transmitter (manufactured by Advanced Photonix, Inc.) was used as a terahertz wave light source, and a T-Ray® 5000 HRS4001 (manufactured by Advanced Photonix, Inc.) was used as a terahertz wave detector.

A hollow generally-circular PTFE was placed on a work turntable, a point on the hollow generally-circular PTFE located at the center of the work turntable was irradiated with terahertz waves, and the polarization intensity of the transmitted terahertz waves was measured.

Next, the work turntable was rotated in increments of 15 degrees, and in each case, one point was irradiated with terahertz waves, and the polarization intensity of the transmitted terahertz waves was measured.

Next, the hollow generally-circular PTFE was rotated 30 degrees around the center of the hollow generally-circular PTFE, and one point on the hollow generally-circular PTFE that came to the center of the work turntable was irradiated with terahertz waves, and the polarization intensity of the transmitted terahertz waves was measured (step (a)).

Next, the work turntable was rotated in increments of 15 degrees, and in each case, one point was irradiated with terahertz waves, and the polarization intensity of the transmitted terahertz waves was measured (step (b)).

The above steps (a) and (b) were repeated until the hollow generally-circular PTFE was rotated 360 degrees around the center of the hollow generally-circular PTFE.

Figure 7:
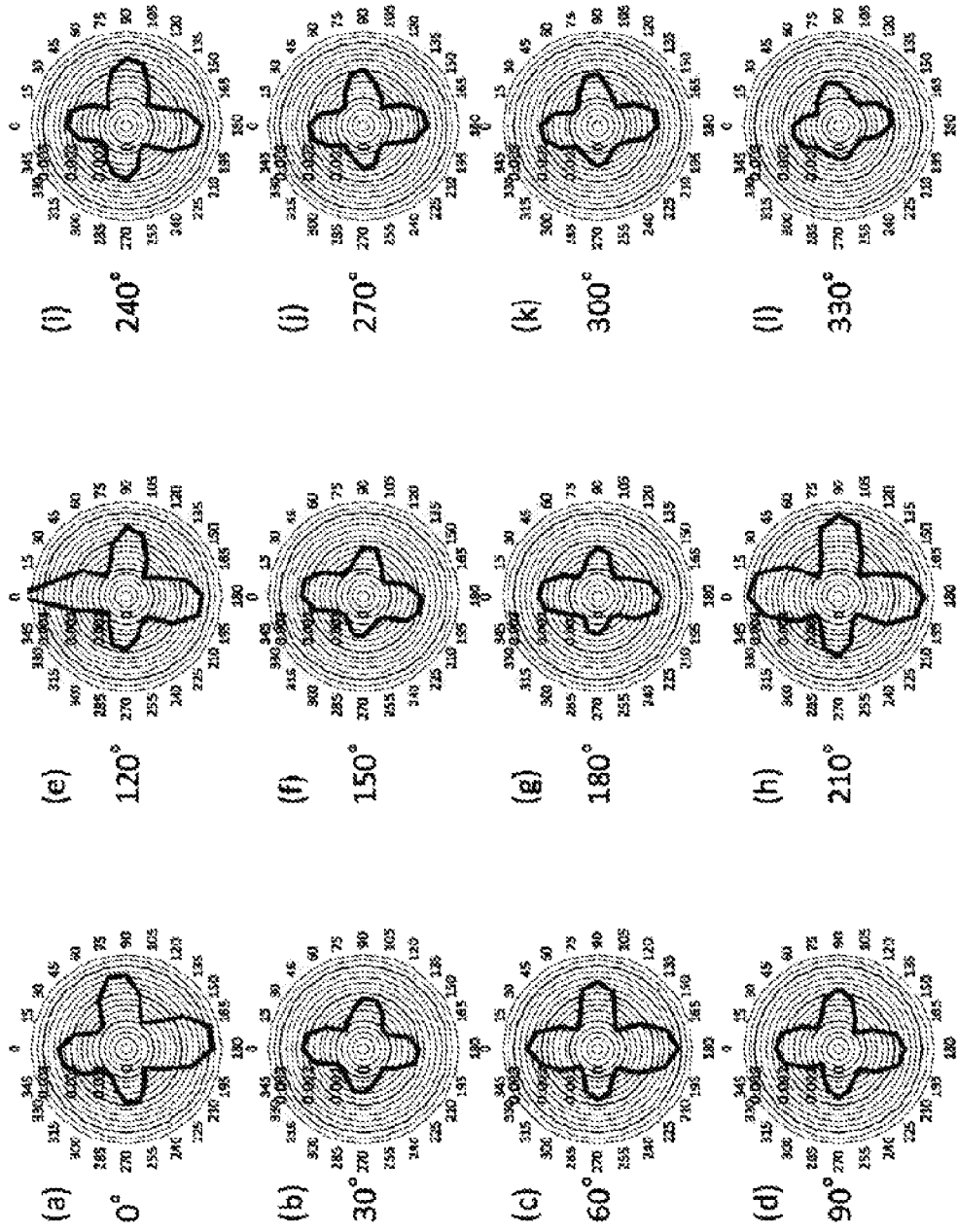
FIG. 7 is a chart showing results of a terahertz wave polarization intensity measurement experiment 1 on hollow generally-circular PTFE.

FIG. 7 shows results obtained at that time. FIG. 7 is a radar chart showing the polarization intensity of terahertz waves measured by rotating the work turntable in degree increments. The circumferential direction indicates the angle of the work turntable, and the radial direction indicates the polarization intensity of the terahertz waves. The figure (a) shows a measurement result of the hollow generally-circular PTFE at the reference position with respect to the work turntable. The figure (b) shows a measurement result at the position where the hollow generally-circular PTFE is rotated 30 degrees from the reference position with respect to the work turntable. The figure (c) shows a measurement result at the position where the hollow generally-circular PTFE is rotated 60 degrees from the reference position with respect to the work turntable. The figure (d) shows a measurement result at the position where the hollow generally-circular PTFE is rotated 90 degrees from the reference position with respect to the work turntable. The figure (e) shows a measurement result at the position where the hollow generally-circular PTFE is rotated 120 degrees from the reference position with respect to the work turntable. The figure (f) shows a measurement result at the position where the hollow generally-circular PTFE is rotated 150 degrees from the reference position with respect to the work turntable. The figure (g) shows a measurement result at the position where the hollow generally-circular PTFE is rotated 180 degrees from the reference position with respect to the work turntable. The figure (h) shows a measurement result at the position where the hollow generally-circular PTFE is rotated 210 degrees from the reference position with respect to the work turntable. The figure (i) shows a measurement result at the position where the hollow generally-circular PTFE is rotated 240 degrees from the reference position with respect to the work turntable. The figure (j) shows a measurement result at the position where the hollow generally-circular PTFE is rotated 270 degrees from the reference position with respect to the work turntable. The figure (k) shows a measurement result at the position where the hollow generally-circular PTFE is rotated 300 degrees from the reference position with respect to the work turntable. The figure (1) shows a measurement result at the position where the hollow generally-circular PTFE is rotated 330 degrees from the reference position with respect to the work turntable.

As can be seen from (a) to (1), the polarization intensity of the terahertz waves reaches a peak (maximum value) at about 0 degrees, about 90 degrees, about 180 degrees, and about 270 degrees (that is, the outer diameter direction and inner diameter direction, and the directions orthogonal thereto) at each position.

From the above experiment, it is understood that in the hollow generally-circular resin molded article 10, a peak (maximum value) of the polarization intensity of the terahertz waves appears about every 90 degrees with respect to the outer diameter direction.

(Terahertz Wave Polarization Intensity Measurement Experiment 2 on Hollow Generally-Circular PTFE)

Terahertz wave polarization intensity measurement experiment was performed on hollow generally-circular PTFE.

The hollow generally-circular PTFE had dimensions of 20.4 mm in outer diameter, 6.4 mm in inner diameter, and 3.0 mm in thickness. As to the PTFE, such PTFE on Day 1 after the baking and cutting, Day 20 after the baking and cutting, and Day 50 after the baking and cutting, were used. A T-Ray® 5000 HTS4002 Transmitter (manufactured by Advanced Photonix, Inc.) was used as a terahertz wave light source, and a T-Ray® 5000 HRS4001 (manufactured by Advanced Photonix, Inc.) was used as a terahertz wave detector.

A hollow generally-circular PTFE was placed on a work turntable, a point on the hollow generally-circular PTFE located at the center of the work turntable was irradiated with terahertz waves, and the polarization intensity of the transmitted terahertz waves was measured.

Next, the work turntable was rotated in increments of 90 degrees, and in each case, one point was irradiated with terahertz waves, and the polarization intensity of the transmitted terahertz waves was measured.

Next, the hollow generally-circular PTFE was rotated 90 degrees around the center of the hollow generally-circular PTFE, and one point on the hollow generally-circular PTFE that came to the center of the work turntable was irradiated with terahertz waves, and the polarization intensity of the transmitted terahertz waves was measured (step (a)).

Next, the work turntable was rotated in increments of 90 degrees, and in each case, one point was irradiated with terahertz waves, and the polarization intensity of the transmitted terahertz waves was measured (step (b)).

The above steps (a) and (b) were repeated until the hollow generally-circular PTFE was rotated 360 degrees around the center of the hollow generally-circular PTFE.

Figure 8A:
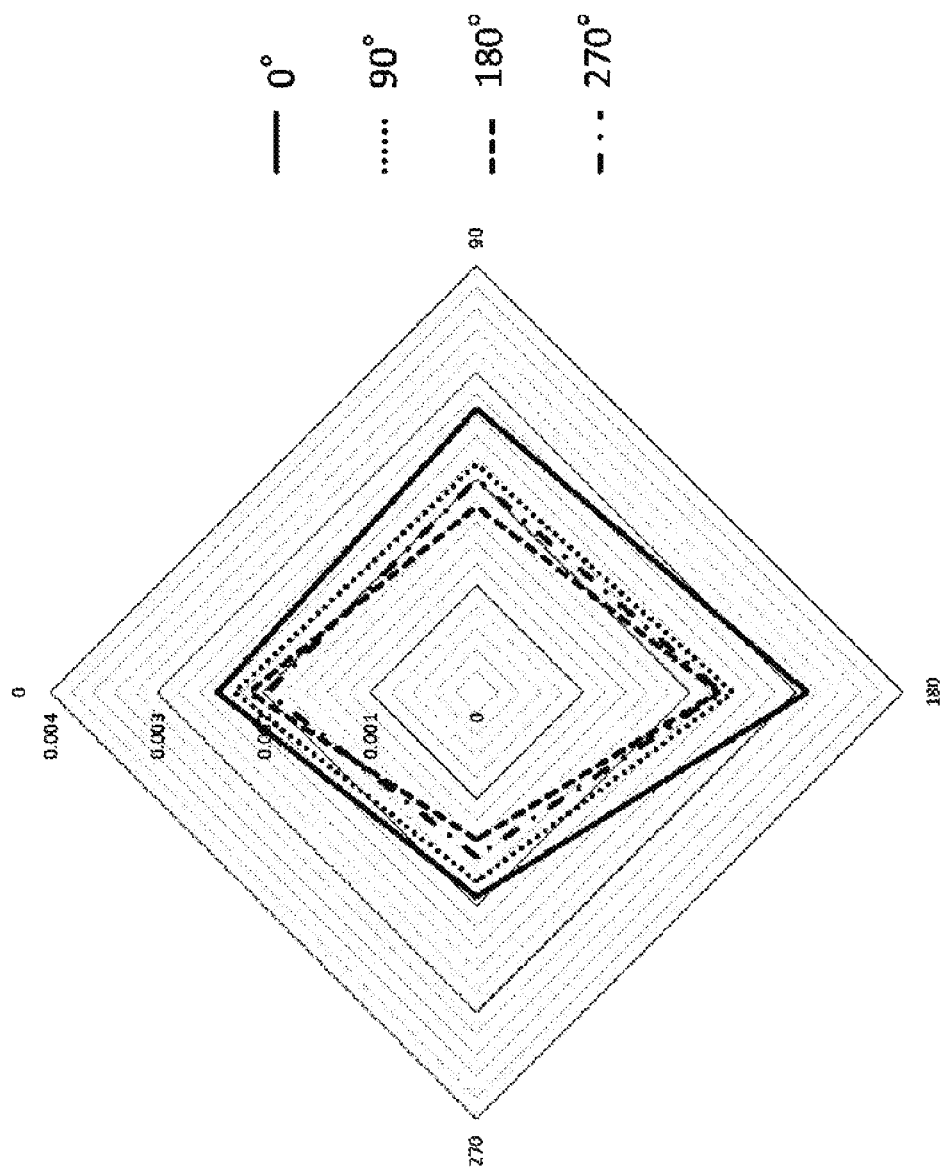
FIG. 8A is a chart showing results of a terahertz wave polarization intensity measurement experiment 2 on hollow generally-circular PTFE.
Figure 8B:
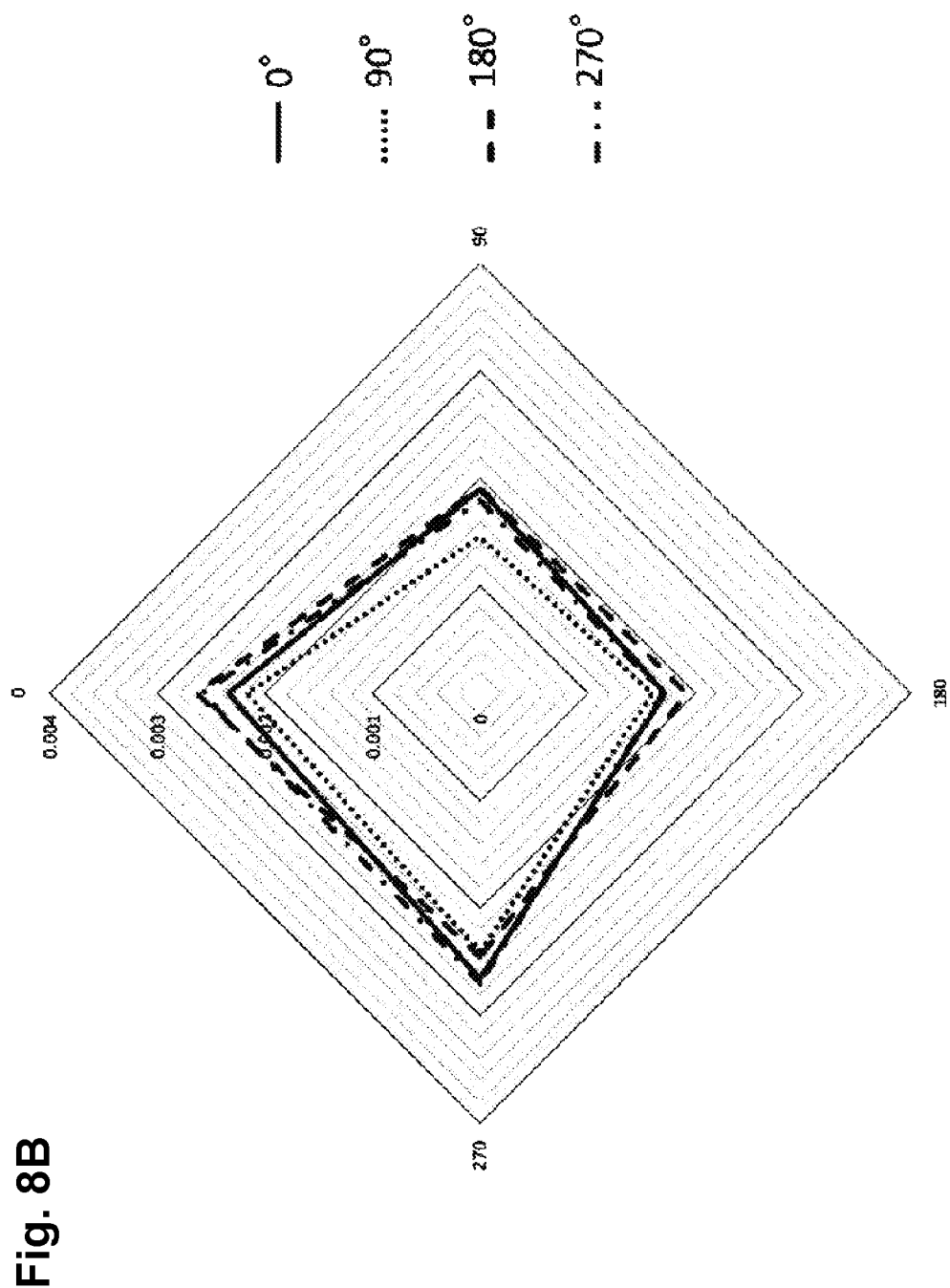
FIG. 8B is a chart showing results of a terahertz wave polarization intensity measurement experiment 2 on hollow generally-circular PTFE.
Figure 8C:
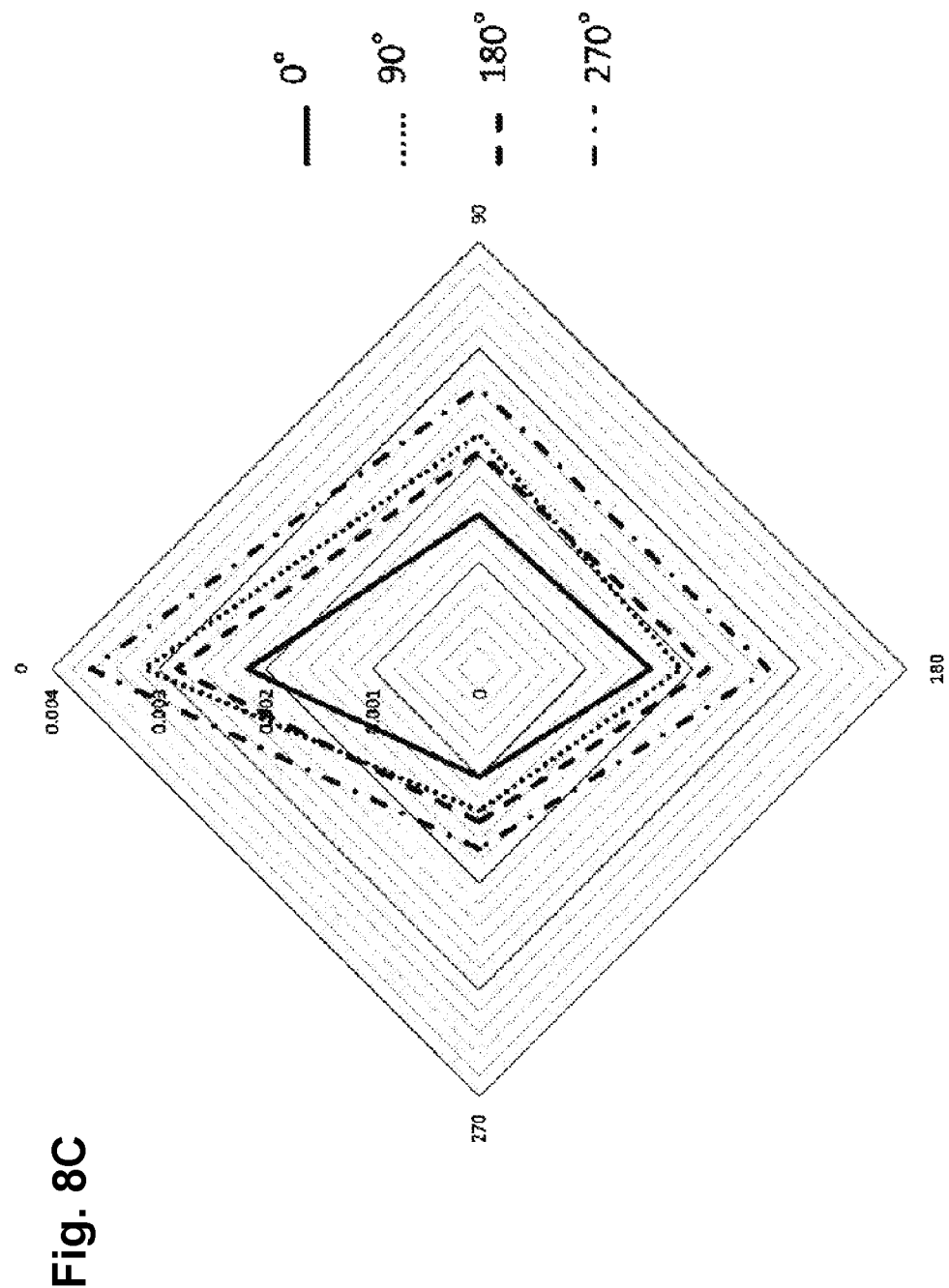
FIG. 8C is a chart showing results of a terahertz wave polarization intensity measurement experiment 2 on hollow generally-circular PTFE.

Table 5 to Table 7 and FIGS. 8A to 8C show results obtained at that time. Table 5 shows the polarization intensities of terahertz waves measured, by rotating the work turntable in 90 degree increments, at each of the four positions on PTFE on Day 1 after baking and cutting, and FIG. 8A shows the polarization intensities converted into radar charts. Table 6 shows the polarization intensities of terahertz waves measured, by rotating the work turntable in 90 degree increments, at each of the four positions on PTFE on Day 20 after baking and cutting, and FIG. 8B shows the polarization intensities converted into radar charts. Table 7 shows the polarization intensities of terahertz waves measured, by rotating the work turntable in 90 degree increments, at each of the four positions on PTFE on Day 50 after baking and cutting, and FIG. 8C shows the polarization intensities converted into radar charts. In FIGS. 8A to 8C, the circumferential direction indicates the angle of the work turntable, and the radial direction indicates the polarization intensity of the terahertz waves.

TABLE 5

|  |  | Work Turntable Angle | | | |
|---|---|---|---|---|---|
|  |  | 0 | 90 | 180 | 270 |
| PTFE Angle | 0 | 0.002430 | 0.002658 | 0.003103 | 0.001916 |
|  | 90 | 0.002271 | 0.002138 | 0.002405 | 0.001771 |
|  | 180 | 0.002131 | 0.001739 | 0.002269 | 0.001379 |
|  | 270 | 0.001961 | 0.001998 | 0.002291 | 0.00154 |
|  |  | 0-90 Correlation Coefficient | 90-180 Correlation Coefficient | 180-270 Correlation Coefficient | 270-0 Correlation Coefficient |
| Correlation Coefficient |  | 0.7791 | 0.9489 | 0.8281 | 0.8017 |

TABLE 6

|  |  | Work Turntable Angle | | | |
|---|---|---|---|---|---|
|  |  | 0 | 90 | 180 | 270 |
| PTFE Angle | 0 | 0.002339 | 0.001901 | 0.00172 | 0.002657 |
|  | 90 | 0.002167 | 0.001457 | 0.0015 | 0.002405 |
|  | 180 | 0.002632 | 0.001915 | 0.00192 | 0.002451 |
|  | 270 | 0.002577 | 0.001797 | 0.001695 | 0.002697 |
|  |  | 0-90 Correlation | 90-180 Correlation | 180-270 Correlation | 270-0 Correlation |

TABLE 6-continued

|  | Coefficient | Coefficient | Coefficient | Coefficient |
|---|---|---|---|---|
| Correlation Coefficient | 0.74971 | 0.7662 | −0.1077 | 0.3173 |

TABLE 7

| | | Work Turntable Angle | | | |
|---|---|---|---|---|---|
| | | 0 | 90 | 180 | 270 |
| PTFE Angle | 0 | 0.00217 | 0.001446 | 0.001601 | 0.001009 |
| | 90 | 0.003128 | 0.002198 | 0.001886 | 0.001326 |
| | 180 | 0.002833 | 0.002035 | 0.002144 | 0.001431 |
| | 270 | 0.003636 | 0.002634 | 0.002707 | 0.001681 |

| | 0-90 Correlation Coefficient | 90-180 Correlation Coefficient | 180-270 Correlation Coefficient | 270-0 Correlation Coefficient |
|---|---|---|---|---|
| Correlation Coefficient | 0.9979 | 0.9011 | 0.9684 | 0.9382 |

FIGS. 8A and 8B show shapes of the radar charts at the respective four positions as irregular shapes, while FIG. 8C shows shapes of the radar charts at the respective four positions as being analogue.

In addition, the average value of the correlation coefficients at the adjacent angles of the polarization intensities of the terahertz waves was 0.8395 for PTFE on Day 1 after baking and cutting, 0.4318 for PTFE on Day 20 after baking and cutting, and 0.9514 for PTFE on Day 50 after baking and cutting.

(Dimensional Measurement Experiment on Hollow Generally-Circular PTFE)

Dimensional measurement experiment was performed on the hollow generally-circular PTFE used in Terahertz Wave Polarization Intensity Measurement Experiment 2 on the hollow generally-circular PTFE as described above.

As for the dimensional measurement, the outer diameter of hollow generally-circular PTFE that was baked and cut at the outer diameter of 20.4 mm was measured at four locations (a total of four locations in 45 degree increments with a certain outer diameter as the reference). The dimensional measurement was performed using Digimatic ID-H0530 manufactured by Mitutoyo Corporation.

Figure 9:
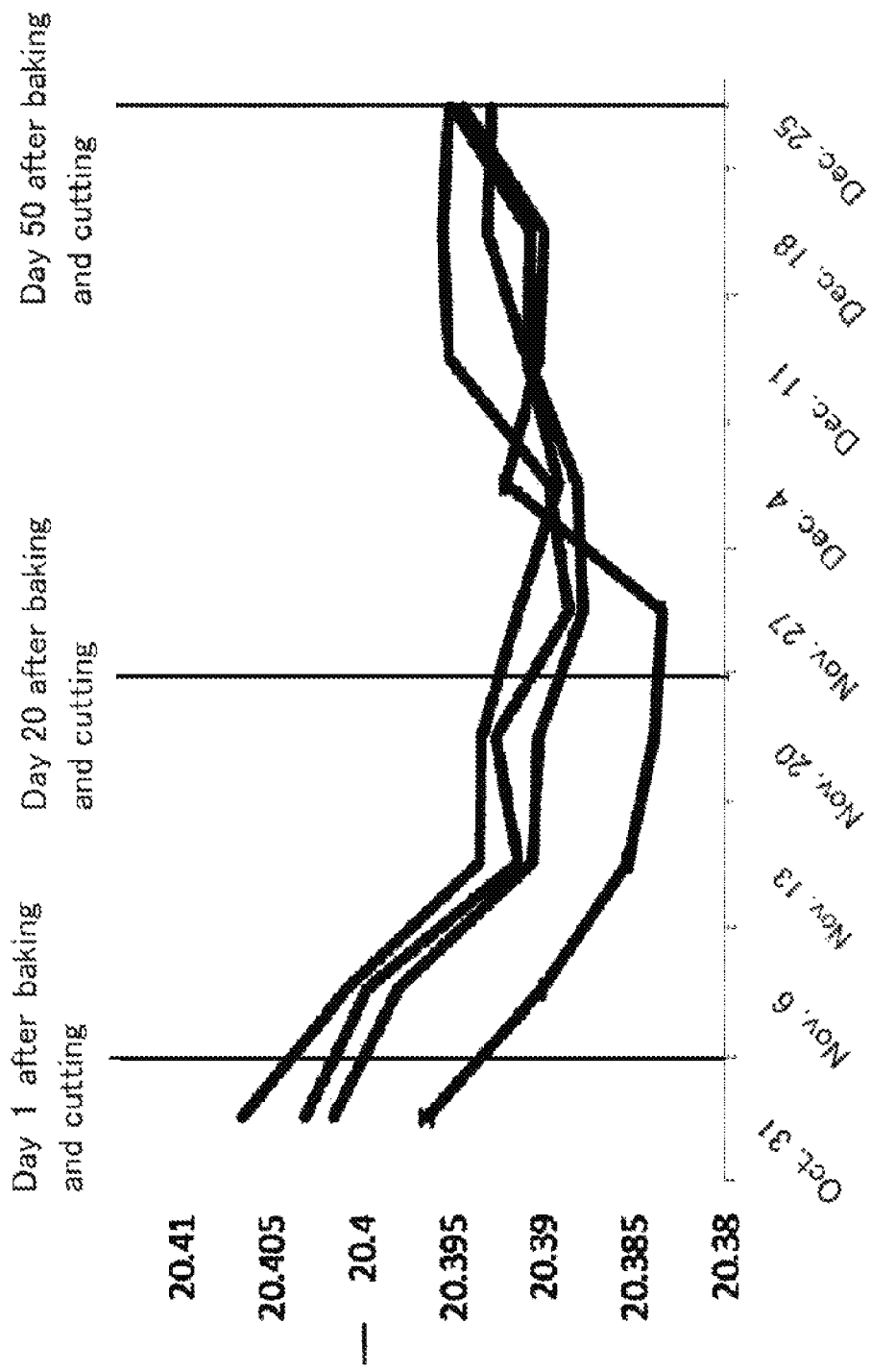
FIG. 9 is a graph showing results of a dimensional measurement experiment performed on hollow generally-circular PTFE.

FIG. 9 shows results obtained at that time. The vertical axis shows the outer diameter dimension (mm), and the horizontal axis shows the time. It can be seen that the outer diameter dimension deforms in the direction of contraction after baking and cutting and tends to converge to a specific value after a certain period of time. In the experiment, the measured values at each measurement point were around 20.395 mm in outer diameter 50 days after the baking and cutting, and although not shown, the range of change in the measured values at each measurement point was about 0.01 µm or less in the subsequent measurements. Therefore, it can be seen that the changes over time reached the convergence 50 days after the baking and cutting.

Accordingly, based on Terahertz Wave Polarization Intensity Measurement Experiment 2 on the hollow generally-circular PTFE and Dimensional Measurement Experiment, it can be seen that the changes in the dimensions over time has reached the convergence when the average value of the correlation coefficients at adjacent angles of the polarization intensities of the terahertz waves exceeds a predetermined threshold value (for example, 0.90).

(Terahertz Wave Polarization Intensity Measurement Experiment 1 on Solid Generally-Circular PTFE)

Terahertz wave polarization intensity measurement experiment was performed on solid generally-circular PTFE.

The solid generally-circular PTFE had dimensions of 20.4 mm in outer diameter and 3.0 mm in thickness. As to the PTFE, such PTFE on Day 20 after the baking and cutting was used. A T-Ray® 5000 HTS4002 Transmitter (manufactured by Advanced Photonix, Inc.) was used as a terahertz wave light source, and a T-Ray® 5000 HRS4001 (manufactured by Advanced Photonix, Inc.) was used as a terahertz wave detector.

A solid generally-circular PTFE was placed on a work turntable, a point on the solid generally-circular PTFE located at the center of the work turntable was irradiated with terahertz waves, and the polarization intensity of the transmitted terahertz waves was measured.

Next, the work turntable was rotated in increments of 15 degrees, and in each case, one point was irradiated with terahertz waves, and the polarization intensity of the transmitted terahertz waves was measured.

Next, the solid generally-circular PTFE was rotated 30 degrees around the center of the solid generally-circular PTFE, and one point on the solid generally-circular PTFE that came to the center of the work turntable was irradiated with terahertz waves, and the polarization intensity of the transmitted terahertz waves was measured (step (a)).

Next, the work turntable was rotated in increments of 30 degrees, and in each case, one point was irradiated with terahertz waves, and the polarization intensity of the transmitted terahertz waves was measured (step (b)).

The above steps (a) and (b) were repeated until the solid generally-circular PTFE was rotated 360 degrees around the center of the solid generally-circular PTFE.

Figure 10:
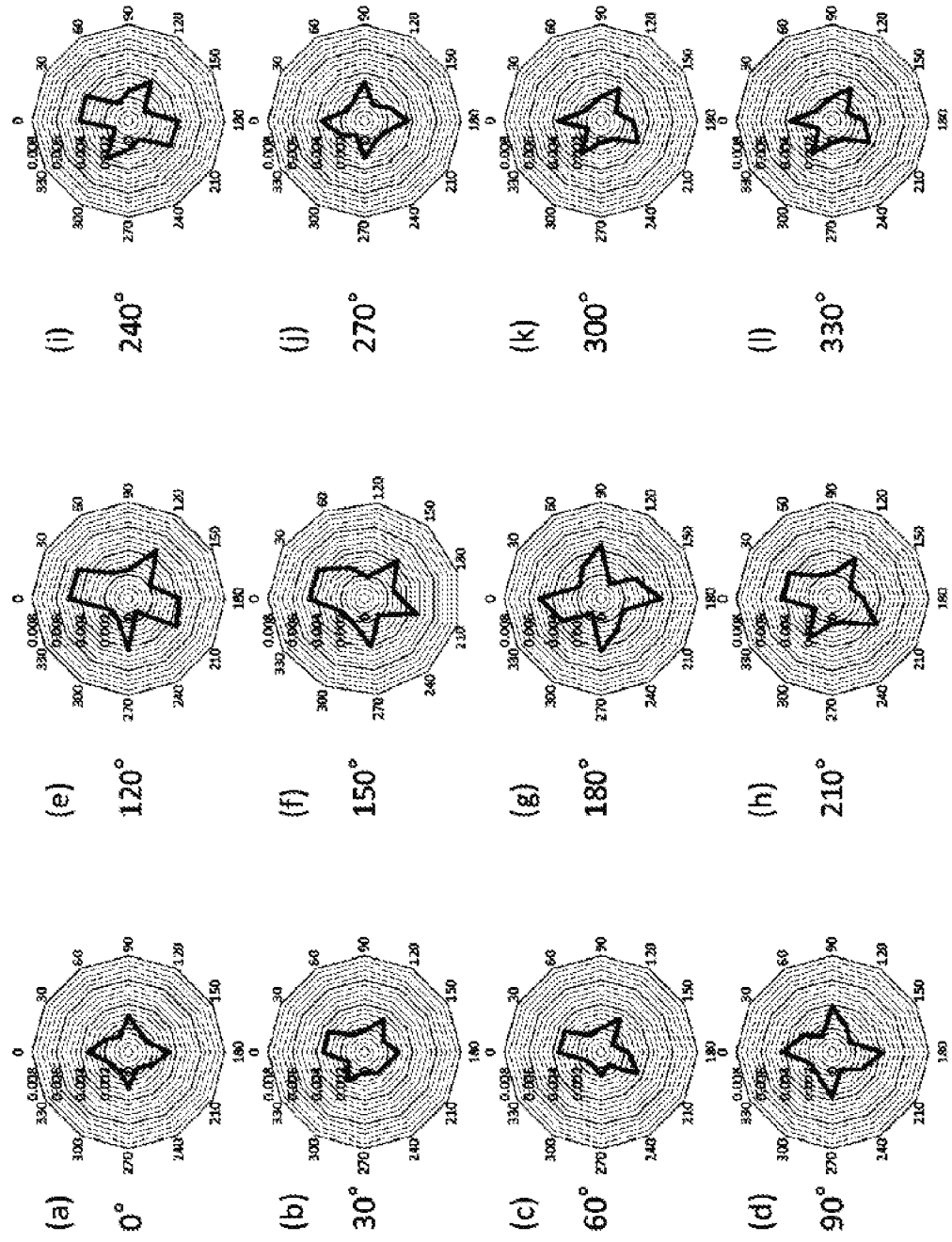
FIG. 10 is a chart showing a terahertz wave polarization intensity measurement experiment 1 performed on solid generally circular PTFE.

FIG. 10 shows results obtained at that time. FIG. 10 is a radar chart showing the polarization intensity of terahertz waves measured by rotating the work turntable in degree increments. The circumferential direction indicates the angle of the work turntable, and the radial direction indicates the polarization intensity of the terahertz waves. The figure (a) shows a measurement result of the solid generally-circular PTFE at the reference position with respect to the work turntable. The figure (b) shows a measurement result at the position where the solid generally-circular PTFE is rotated 30 degrees from the reference position with respect to the work turntable. The figure (c) shows a measurement result at the position where the solid generally-circular PTFE is rotated 60 degrees from the reference position with respect to the work turntable. The figure (d) shows a measurement result at the position where the solid generally-circular PTFE is rotated 90 degrees from the reference position with respect to the work turntable. The figure (e) shows a measurement result at the position where the solid generally-circular PTFE is rotated 120 degrees from the reference position with respect to the work turntable. The figure (f) shows a measurement result at the position where the solid generally-circular PTFE is rotated 150 degrees from the reference position with respect to the work turntable. The figure (g) shows a measurement result at the position where the solid generally-circular PTFE is rotated 180 degrees from the reference position with respect to the work turntable. The figure (h) shows a measurement result at the position where the solid generally-circular PTFE is rotated 210 degrees from the reference position with respect to the work turntable. The figure (i) shows a measurement result at the position where the solid generally-circular PTFE is rotated 240 degrees from the reference position with respect to the work turntable. The figure (j) shows a measurement result at the position where the solid generally-circular PTFE is rotated 270 degrees from the reference position with respect to the work turntable. The figure (k) shows a measurement result at the position where the solid generally-circular PTFE is rotated 300 degrees from the reference position with respect to the work turntable. The figure (1) shows a measurement result at the position where the solid generally-circular PTFE is rotated 330 degrees from the reference position with respect to the work turntable.

As can be seen from (a) to (1), the polarization intensity of the terahertz waves reaches a peak (maximum value) at about 0 degrees, about 90 degrees, about 180 degrees, and about 270 degrees (that is, the outer diameter direction, and the directions orthogonal thereto) at each position.

From the above experiment, it is understood that in the solid generally-circular resin molded article 10, a peak (maximum value) of the polarization intensity of the terahertz waves appears about every 90 degrees with respect to the outer diameter direction.

(Terahertz Wave Polarization Intensity Measurement Experiment 2 on Solid Generally-Circular PTFE)

Terahertz wave polarization intensity measurement experiment was performed on solid and generally-circular PTFE.

The solid generally-circular PTFE had dimensions of 20.4 mm in outer diameter and 3.0 mm in thickness. As to the PTFE, such PTFE on Day 20 after the baking and cutting, and Day 40 after the baking and cutting, were used. A T-Ray® 5000 HTS4002 Transmitter (manufactured by Advanced Photonix, Inc.) was used as a terahertz wave light source, and a T-Ray® 5000 HRS4001 (manufactured by Advanced Photonix, Inc.) was used as a terahertz wave detector.

A solid generally-circular PTFE was placed on a work turntable, a point on the solid generally-circular PTFE located at the center of the work turntable was irradiated with terahertz waves, and the polarization intensity of the transmitted terahertz waves was measured.

Next, the work turntable was rotated in increments of 90 degrees, and in each case, one point was irradiated with terahertz waves, and the polarization intensity of the transmitted terahertz waves was measured.

Next, the solid generally-circular PTFE was rotated 90 degrees around the center of the solid generally-circular PTFE, and one point on the solid generally-circular PTFE that came to the center of the work turntable was irradiated with terahertz waves, and the polarization intensity of the transmitted terahertz waves was measured (step (a)).

Next, the work turntable was rotated in increments of 90 degrees, and in each case, one point was irradiated with terahertz waves, and the polarization intensity of the transmitted terahertz waves was measured (step (b)).

The above steps (a) and (b) were repeated until the solid generally-circular PTFE was rotated 360 degrees around the center of the solid generally-circular PTFE.

Figure 11A:
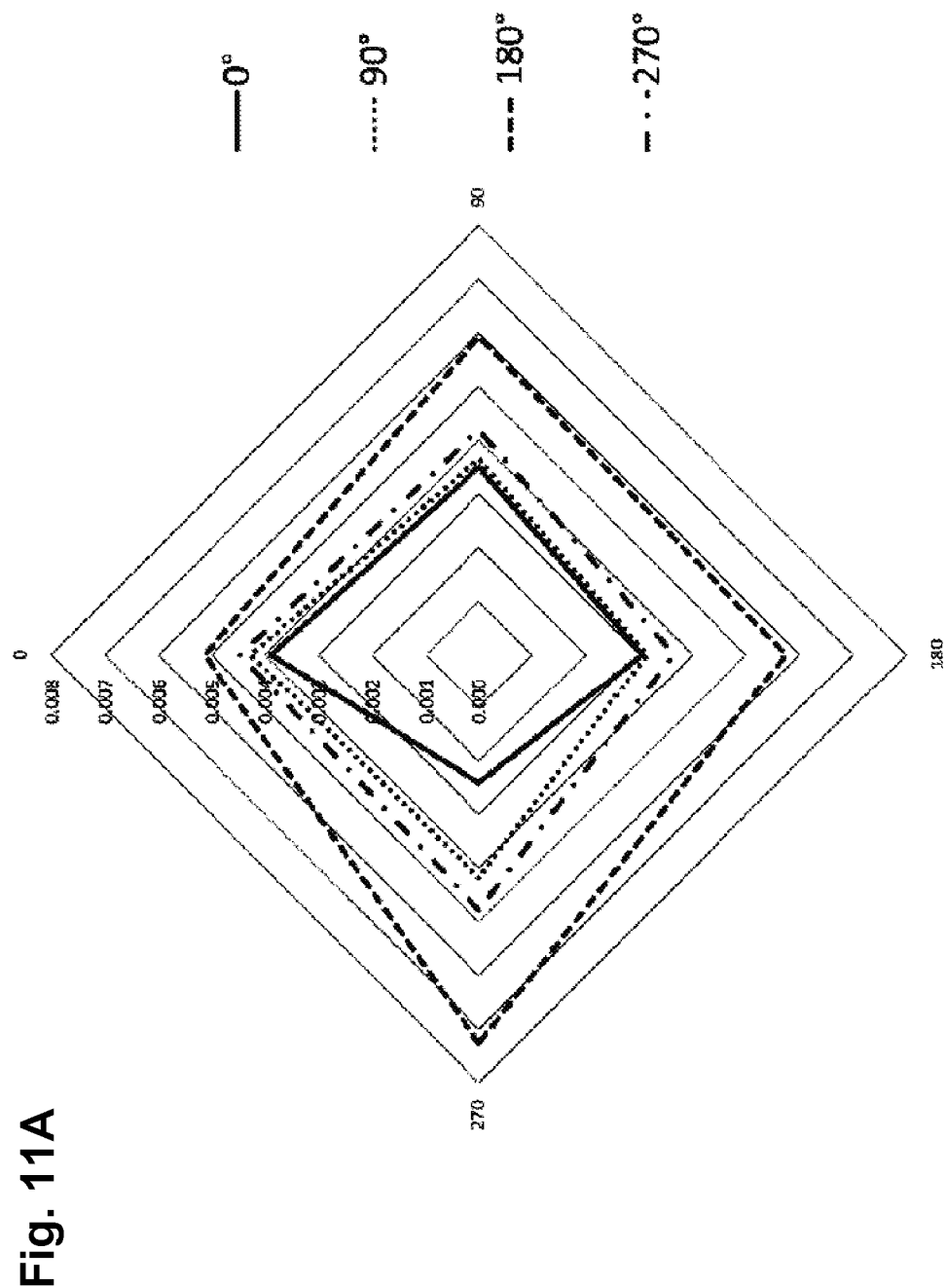
FIG. 11A is a chart showing a terahertz wave polarization intensity measurement experiment 2 performed on solid generally-circular PTFE.
Figure 11B:
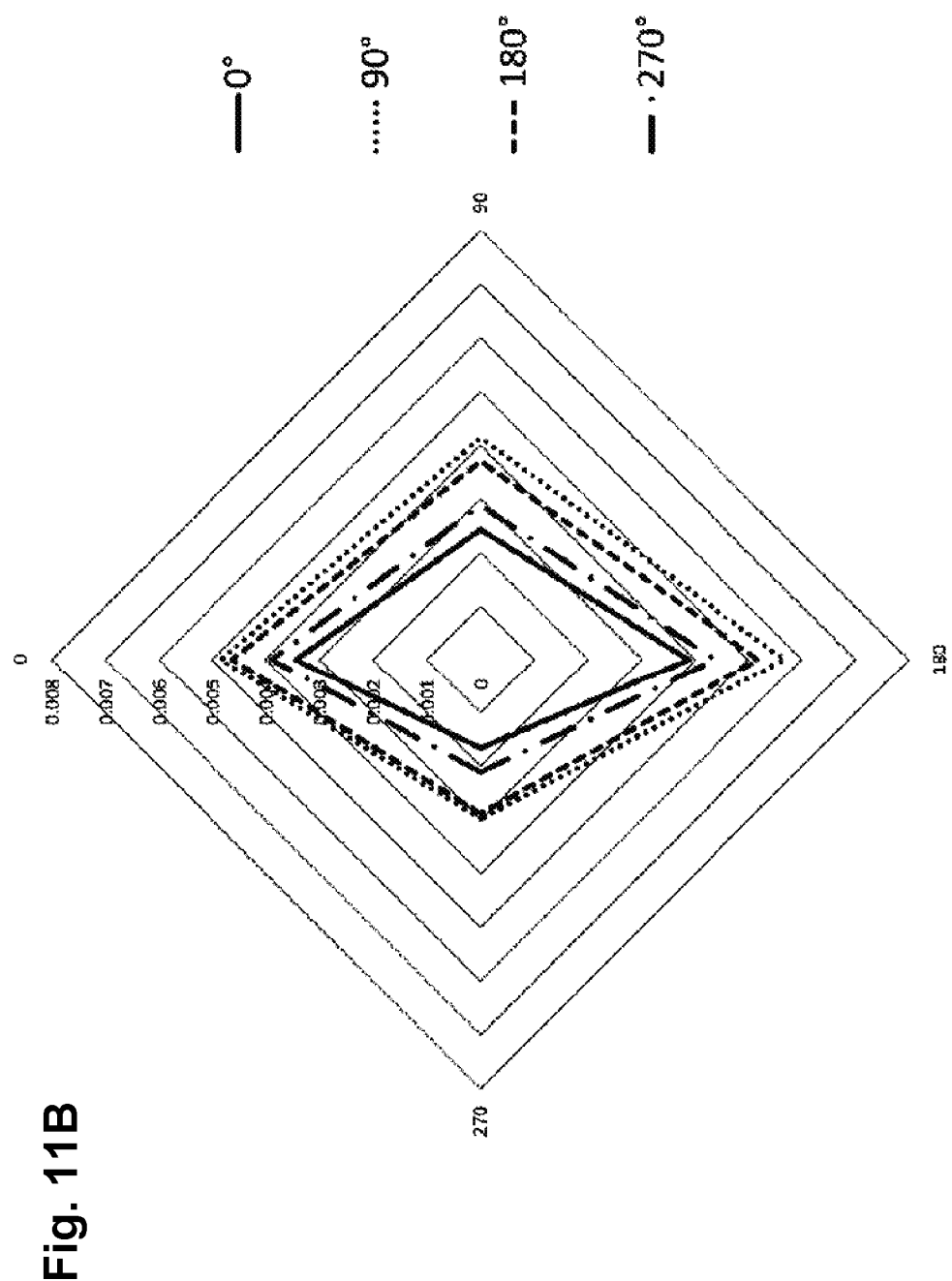
FIG. 11B is a chart showing Terahertz Wave Polarization Intensity Measurement Experiment 2 performed on solid generally-circular PTFE.

Table 8 and Table 9 and FIGS. 11A and 11B show results obtained at that time. Table 8 shows the polarization intensities of terahertz waves measured, by rotating the work turntable in 90 degree increments, at each of the four positions on PTFE on Day 20 after baking and cutting, and FIG. 11A shows the polarization intensities converted into radar charts. Table 9 shows the polarization intensities of terahertz waves measured, by rotating the work turntable in 90 degree increments, at each of the four positions on PTFE on Day 40 after baking and cutting, and FIG. 11B shows the polarization intensities converted into radar charts. In FIGS. 11A and 11B, the circumferential direction indicates the angle of the work turntable, and the radial direction indicates the polarization intensity of the terahertz waves.

TABLE 8

| | | Work Turntable Angle | | | |
|---|---|---|---|---|---|
| | | 0 | 90 | 180 | 270 |
| PTFE Angle | 0 | 0.003886 | 0.003502 | 0.003051 | 0.002410 |
| | 90 | 0.004268 | 0.003653 | 0.003147 | 0.004177 |
| | 180 | 0.005135 | 0.005927 | 0.005749 | 0.007261 |
| | 270 | 0.004464 | 0.004196 | 0.003641 | 0.004777 |
| | | 0-90 Correlation Coefficient | 90-180 Correlation Coefficient | 180-270 Correlation Coefficient | 270-0 Correlation Coefficient |
| Correlation Coefficient | | 0.9640 | 0.9978 | 0.9290 | 0.9979 |

[Table 9]

TABLE 9

| | | Work Turntable Angle | | | |
|---|---|---|---|---|---|
| | | 0 | 90 | 180 | 270 |
| PTFE Angle | 0 | 0.003439 | 0.002431 | 0.003878 | 0.001663 |
| | 90 | 0.004836 | 0.004143 | 0.005678 | 0.002983 |
| | 180 | 0.004625 | 0.003703 | 0.005192 | 0.00288 |
| | 270 | 0.003892 | 0.002885 | 0.004375 | 0.002112 |
| | | 0-90 Correlation Coefficient | 90-180 Correlation Coefficient | 180-270 Correlation Coefficient | 270-0 Correlation Coefficient |
| Correlation Coefficient | | 0.9940 | 0.9998 | 0.9830 | 0.9978 |

FIG. 11A shows shapes of the radar charts at the respective four positions as irregular shapes compared to those in FIG. 11B, while FIG. 11B shows shapes of the radar charts at the respective four positions as being analogue compared to those in FIG. 11A.

In addition, the average value of the correlation coefficients at the adjacent angles of the polarization intensities of the terahertz waves was 0.9722 for PTFE on Day 20 after baking and cutting, and 0.9936 for PTFE on Day 40 after baking and cutting.

(Dimensional Measurement Experiment on Solid Generally-Circular PTFE)

Dimensional measurement experiment was performed on the solid generally-circular PTFE used in Terahertz Wave Polarization Intensity Measurement Experiment 2 on the solid generally-circular PTFE as described above.

As for the dimensional measurement, the outer diameter of solid generally-circular PTFE that was baked and cut at the outer diameter of 20.4 mm was measured at four locations (a total of four locations in 45 degree increments with a certain outer diameter as the reference). The dimensional measurement was performed using Digimatic ID-H0530 manufactured by Mitutoyo Corporation.

Figure 12:
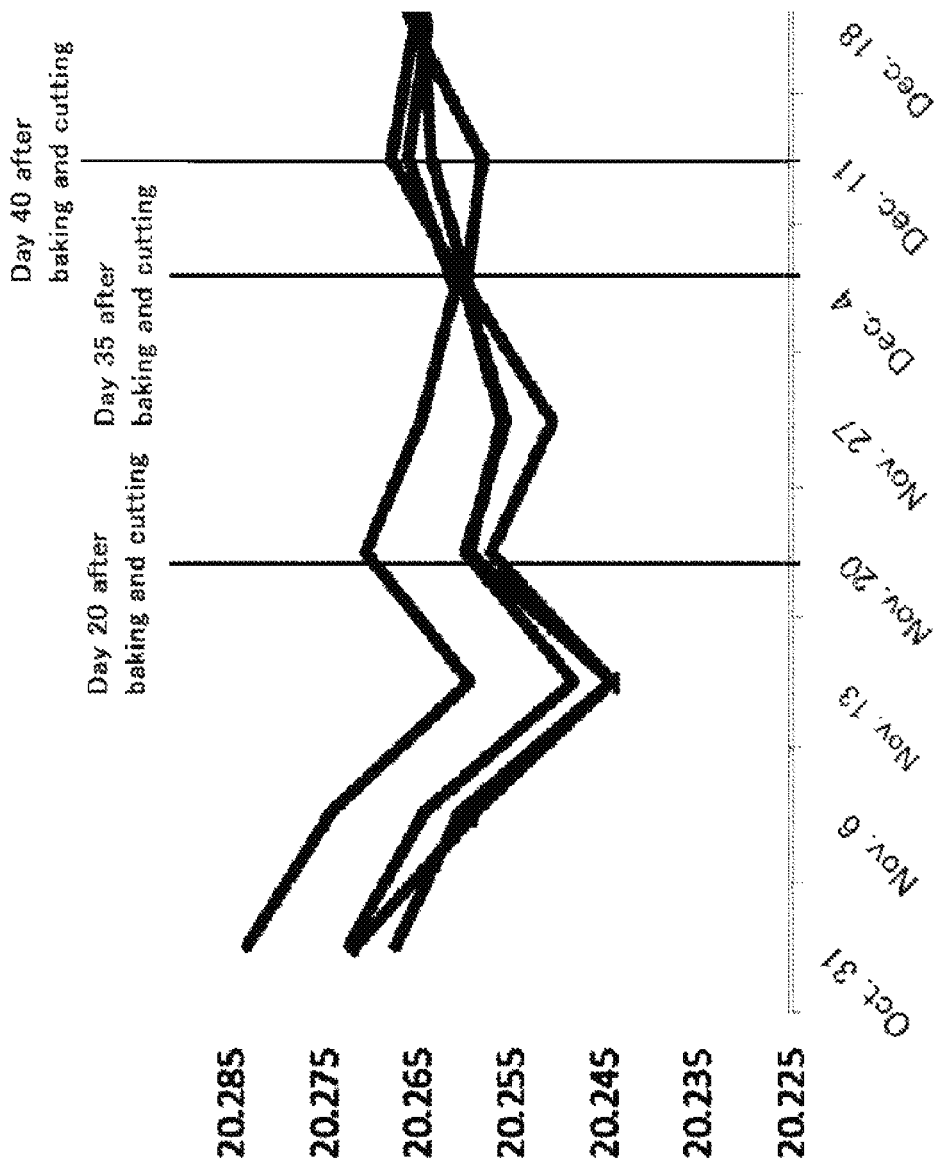
FIG. 12 is a graph showing results of a dimensional measurement experiment performed on solid generally-circular PTFE.

FIG. 12 shows results obtained at that time. The vertical axis shows the outer diameter dimension (mm), and the horizontal axis shows the time. It can be seen that the outer diameter dimension deforms in the direction of contraction after baking and cutting and tends to converge to a specific value after a certain period of time. In the experiment, the measured values at each measurement point were around 20.260 mm in outer diameter 35 days after the baking and cutting, and the range of change in the measured values at each measurement point was about 1 μm or less in the subsequent measurements. Therefore, it can be seen that the changes over time reached the convergence 35 days after the baking and cutting at the latest.

Accordingly, based on Terahertz Wave Polarization Intensity Measurement Experiment 2 on the solid generally-circular PTFE and Dimensional Measurement Experiment, it can be seen that the changes in the dimensions over time has reached the convergence when the average value of the correlation coefficients at adjacent angles of the polarization intensities of the terahertz waves exceeds a predetermined threshold value (for example, 0.98).

(Terahertz Wave Polarization Intensity Measurement Experiment on PTFE with Compressive Force Applied Thereto)

Terahertz wave polarization intensity measurement experiment was performed on solid generally-circular PTFE in a state where a compressive force was applied thereto.

The solid generally-circular PTFE had dimensions of 20.4 mm in outer diameter. A T-Ray® 5000 HTS4002 Transmitter (manufactured by Advanced Photonix, Inc.) was used as a terahertz wave light source, and a T-Ray® 5000 HRS4001 (manufactured by Advanced Photonix, Inc.) was used as a terahertz wave detector.

Compressive force was applied to the solid generally-circular PTFE using a press clamp. Terahertz wave polarization intensity measurement experiment was performed in each of the state where the PTFE was simply held by the clamp (no compressive force), the state where the compression screw of the clamp was turned once and a compressive force (compressive force 1) was applied, and the state where the compression screw of the clamp was turned twice and a compressive force (compressive force 2) was applied.

The solid generally-circular PTFE was placed on a work turntable, a point on the solid generally-circular PTFE located at the center of the work turntable was irradiated with terahertz waves, and the polarization intensity of the transmitted terahertz waves was measured.

Figure 13:
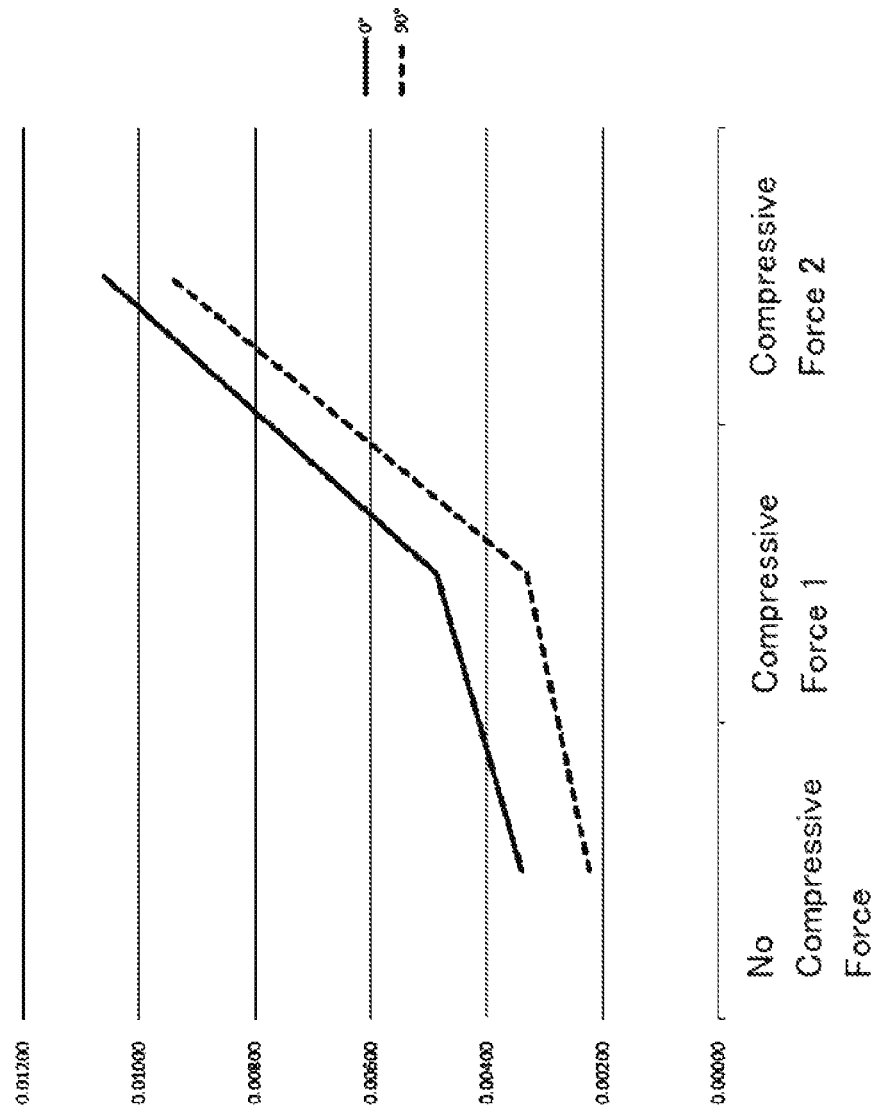
FIG. 13 is a graph showing results of a terahertz wave polarization intensity measurement experiment performed on PTFE with a compressive force applied thereto.

FIG. 13 shows results obtained at that time. The vertical axis shows the terahertz wave polarization intensity, and the horizontal axis shows the compressive force.

From FIG. 13, it can be seen that there is a generally linear relationship between the polarization intensity of the terahertz waves and the compressive force.

(Terahertz Wave Polarization Intensity Measurement Experiment on PTFE with Carbon C Mixed Therewith)

Terahertz wave polarization intensity measurement experiment was performed on solid generally-circular PTFE with carbon C mixed therewith.

The solid generally-circular PTFE had dimensions of 20.4 mm in outer diameter. A T-Ray® 5000 HTS4002 Transmitter (manufactured by Advanced Photonix, Inc.) was used as a terahertz wave light source, and a T-Ray® 5000 HRS4001 (manufactured by Advanced Photonix, Inc.) was used as a terahertz wave detector.

Terahertz wave polarization intensity measurement experiment was performed on each of PTFE not mixed with carbon C, PTFE mixed with 1% carbon C, and PTFE mixed with 2% carbon C.

The solid generally-circular PTFE was placed on a work turntable, a point on the solid generally-circular PTFE located at the center of the work turntable was irradiated with terahertz waves, and the polarization intensity of the transmitted terahertz waves was measured.

Next, the work turntable was rotated in increments of 30 degrees, and in each case, one point was irradiated with terahertz waves, and the polarization intensity of the transmitted terahertz waves was measured.

FIG. 14 shows results obtained at that time. In FIG. 14($a$), the vertical axis shows the terahertz wave polarization intensity, and the horizontal axis shows the rotation angle of the work turntable, in which the uppermost graph shows the result of PTFE not mixed with carbon, the central graph shows the result of 1% carbon-mixed PTFE, and the lowermost graph shows the result of 2% carbon-mixed PTFE. FIG. 14($b$) shows a calibration curve acquired by averaging the respective graphs in FIG. 14($a$). The vertical axis shows the terahertz wave polarization intensity, and the horizontal axis shows the carbon mixing ratio.

From FIG. 14($b$), it can be seen that there is a generally linear relationship between the polarization intensity of the terahertz waves and the carbon mixing ratio.

The present invention is not limited to the above-described embodiments. It is understood that the present invention should be construed only by the claims. It is understood that those skilled in the art can implement an equivalent scope from the description of the specific preferred embodiments of the present invention based on the description of the present invention and common general knowledge.

INDUSTRIAL APPLICABILITY

The present invention is advantageous in that it can provide a method, or the like, for estimating the convergence of changes in the dimensions of a molded article over time.

DESCRIPTION OF REFERENCE NUMERALS 11 terahertz waves
12 polymer crystal
100 system
110 terahertz wave light source
120 terahertz wave detector
130 computer system
200 database unit
300 work turntable

The invention claimed is:

1. A method for estimating convergence of changes in dimensions of a molded article over time, the method comprising:
   irradiating a molded article with terahertz waves at multiple positions thereon, wherein the molded article is irradiated with the terahertz waves at each position thereon in multiple orientations about an optical axis;
   measuring polarization intensities of the terahertz waves transmitted through or reflected from the molded article; and
   determining whether the polarization intensities at the multiple positions are in a given relationship with each other.

2. The method of claim 1, wherein the multiple orientations about the optical axis include multiple orientations with maximum polarization intensity, and the given relationship includes a relationship in which the polarization intensities at the multiple positions, in one of the multiple orientations with maximum polarization intensity, correlates with the polarization intensities at the multiple positions in another one of the multiple orientations with the maximum polarization intensity.

3. The method of claim 2, wherein the given relationship includes a relationship in which the polarization intensities at the multiple positions, in one of adjacent orientations of the multiple orientations with maximum polarization intensity, correlates with the polarization intensities at the multiple positions in another one of the adjacent orientations of the multiple orientations with the maximum polarization intensity.

4. The method of claim 2, wherein the correlation includes a correlation coefficient of about 0.9 or more.

5. The method of claim 1, wherein the molded article is a generally-circular member.

6. The method of claim 5, wherein the multiple positions are at least four positions, and the at least four positions are $(a, 0)$, $(-a, 0)$, $(0, a)$, $(0, -a)$ with the center of the generally-circular member defined as the origin, where $0<a<r$, with r representing the radius of the generally-circular member.

7. The method of claim 5, wherein the generally-circular member is hollow.

8. The method of claim 5, wherein the generally-circular member is solid.

9. The method of claim 1, wherein the multiple orientations about the optical axis includes about zero degrees, about 90 degrees, about 180 degrees, and about 270 degrees.

10. The method of claim 1, further comprising estimating a compressive or tensile force applied to the molded article, based on the measured polarization intensity.

11. The method of claim 1, further comprising estimating a ratio of mixture mixed with the molded article, based on the measured polarization intensity.

12. The method of claim 11, wherein the mixture includes at least one of carbon, glass fiber, carbon fiber, and molybdenum.

13. The method of claim 1, wherein the molded article includes resin.

14. The method of claim 13, wherein the resin includes polytetrafluoroethylene (PTFE).

15. A system for estimating convergence of changes in dimensions of a molded article over time, the system comprising:
- an irradiation means for irradiating a molded article with terahertz waves at multiple positions thereon, wherein the molded article is irradiated with the terahertz waves at each position thereon in multiple orientations about an optical axis;
- a measuring means for measuring polarization intensities of the terahertz waves transmitted through or reflected from the molded article; and
- a determining means for determining whether the polarization intensities at the multiple positions are in a given relationship with each other.

* * * * *